(12) United States Patent
Wong et al.

(10) Patent No.: US 10,997,213 B2
(45) Date of Patent: May 4, 2021

(54) DATABASE QUERIES USING DYNAMICALLY CALCULATED DIMENSIONS

(71) Applicant: SAP SE, Walldorf (DE)

(72) Inventors: Justin Wong, Burnaby (CA); Clarence Chuahuico, Port Coquitlam (CA)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 16/100,183

(22) Filed: Aug. 9, 2018

(65) Prior Publication Data

US 2020/0050698 A1 Feb. 13, 2020

(51) Int. Cl.
| | |
|---|---|
| *G06F 16/00* | (2019.01) |
| *G06F 16/28* | (2019.01) |
| *G06F 16/26* | (2019.01) |
| *G06F 16/25* | (2019.01) |
| *G06F 16/22* | (2019.01) |

(52) U.S. Cl.
CPC ........ *G06F 16/283* (2019.01); *G06F 16/2228* (2019.01); *G06F 16/252* (2019.01); *G06F 16/26* (2019.01)

(58) Field of Classification Search
None
See application file for complete search history.

(56) References Cited

U.S. PATENT DOCUMENTS

| | | | | |
|---|---|---|---|---|
| 8,108,431 | B1 * | 1/2012 | Guner | G06F 16/24561 |
| | | | | 707/792 |
| 9,842,137 | B2 * | 12/2017 | Faerber | G06F 16/24542 |
| 2004/0236767 | A1 * | 11/2004 | Soylemez | G06F 16/283 |
| 2004/0260671 | A1 * | 12/2004 | Potter | G06F 16/283 |
| 2005/0216378 | A1 * | 9/2005 | Bickel | G06Q 40/12 |
| | | | | 705/30 |
| 2008/0071799 | A1 * | 3/2008 | Evans | G06Q 10/06 |
| 2013/0159307 | A1 * | 6/2013 | Wolge | G06F 16/26 |
| | | | | 707/737 |
| 2013/0174118 | A1 * | 7/2013 | Ziegler | G06F 8/443 |
| | | | | 717/106 |
| 2016/0335303 | A1 * | 11/2016 | Madhalam | G06F 16/252 |

* cited by examiner

*Primary Examiner* — Bai D Vu
(74) *Attorney, Agent, or Firm* — Fountainhead Law Group P.C.

(57) ABSTRACT

Some embodiments provide a non-transitory machine-readable medium that stores a program. The program receives from a client device a request for data stored in a database categorized based on a calculated dimension. The program further generates the calculated dimension based on a subset of the data stored in the database. The program also generates an intermediary data structure by combining the calculated dimension with the data stored in the database. The program further generates results for the request by aggregating the data in the intermediary data structure based on the calculated dimension. The program also provides the results for the request to the client device.

17 Claims, 16 Drawing Sheets

| Region | Product | Version | Profit ($M) |
|---|---|---|---|
| US | Tennis Shoes | Actual | 13.3 |
| US | Tennis Shoes | Forecast | 13.4 |
| US | Running Shoes | Actual | 4.8 |
| US | Running Shoes | Forecast | 5.4 |
| US | Shorts | Actual | 8.4 |
| US | Shorts | Forecast | 7.8 |
| US | Hats | Actual | 1.1 |
| US | Hats | Forecast | 4.2 |
| Canada | Tennis Shoes | Actual | 13.6 |
| Canada | Tennis Shoes | Forecast | 11.9 |
| Canada | Running Shoes | Actual | 6.4 |
| Canada | Running Shoes | Forecast | 7.1 |
| Canada | Shorts | Actual | 4.0 |
| Canada | Shorts | Forecast | 2.9 |
| Canada | Hats | Actual | 12.2 |
| Canada | Hats | Forecast | 7.6 |
| Japan | Tennis Shoes | Actual | 8.5 |
| Japan | Tennis Shoes | Forecast | 5.7 |
| Japan | Running Shoes | Actual | 14.8 |
| Japan | Running Shoes | Forecast | 15.6 |
| Japan | Shorts | Actual | 17.1 |
| Japan | Shorts | Forecast | 9.9 |
| Japan | Hats | Actual | 6.7 |
| Japan | Hats | Forecast | 12.9 |

FIG. 2

| Profit ($M) | Product from Country |
|---|---|
| 13.3 | Tennis Shoes from US |
| 4.8 | Running Shoes from US |
| 8.4 | Shorts from US |
| 1.1 | Hats from US |
| 13.6 | Tennis Shoes from Canada |
| 6.4 | Running Shoes from Canada |
| 4.0 | Shorts From Canada |
| 12.2 | Hats From Canada |
| 8.5 | Tennis Shoes from Japan |
| 14.8 | Running Shoes from Japan |
| 17.1 | Shorts From Japan |
| 6.7 | Hats From Japan |

| Product | Footwear and Others |
|---|---|
| Tennis Shoes | Footwear |
| Running Shoes | Footwear |
| Shorts | Others |
| Hats | Others |
| Tennis Shoes | Footwear |
| Running Shoes | Footwear |
| Shorts | Others |
| Hats | Others |
| Tennis Shoes | Footwear |
| Running Shoes | Footwear |
| Shorts | Others |
| Hats | Others |

| Product | Profit ($M) | Footwear and Others |
|---|---|---|
| Tennis Shoes | 13.3 | Footwear |
| Running Shoes | 4.8 | Footwear |
| Shorts | 8.4 | Others |
| Hats | 1.1 | Others |
| Tennis Shoes | 13.6 | Footwear |
| Running Shoes | 6.4 | Footwear |
| Shorts | 4.0 | Others |
| Hats | 12.2 | Others |
| Tennis Shoes | 8.5 | Footwear |
| Running Shoes | 14.8 | Footwear |
| Shorts | 17.1 | Others |
| Hats | 6.7 | Others |

| Profit ($M) | Footwear and Others |
|---|---|
| 61.4 | Footwear |
| 49.5 | Others |

| Region | Product | Version | Profit Rating |
|---|---|---|---|
| US | Tennis Shoes | Actual | Medium |
| US | Running Shoes | Actual | Low |
| US | Shorts | Actual | Medium |
| US | Hats | Actual | Low |
| Canada | Tennis Shoes | Actual | Medium |
| Canada | Running Shoes | Actual | Medium |
| Canada | Shorts | Actual | Low |
| Canada | Hats | Actual | Medium |
| Japan | Tennis Shoes | Actual | Medium |
| Japan | Running Shoes | Actual | Medium |
| Japan | Shorts | Actual | High |
| Japan | Hats | Actual | Medium |

| Region | Product | Version | Profit ($M) | Profit Rating |
|---|---|---|---|---|
| US | Tennis Shoes | Actual | 13.3 | Medium |
| US | Running Shoes | Actual | 4.8 | Low |
| US | Shorts | Actual | 8.4 | Medium |
| US | Hats | Actual | 1.1 | Low |
| Canada | Tennis Shoes | Actual | 13.6 | Medium |
| Canada | Running Shoes | Actual | 6.4 | Medium |
| Canada | Shorts | Actual | 4.0 | Low |
| Canada | Hats | Actual | 12.2 | Medium |
| Japan | Tennis Shoes | Actual | 8.5 | Medium |
| Japan | Running Shoes | Actual | 14.8 | Medium |
| Japan | Shorts | Actual | 17.1 | High |
| Japan | Hats | Actual | 6.7 | Medium |

| Profit ($M) | Profit Rating |
|---|---|
| 17.1 | High |
| 83.9 | Medium |
| 9.9 | Low |

FIG. 16

DATABASE QUERIES USING DYNAMICALLY CALCULATED DIMENSIONS

BACKGROUND

Databases are one or many ways of managing and storing data in computing systems. Some databases can be defined to include different tables. Each table may have one or more columns. A row of data in a table can have a value stored in one or more of the columns. Queries may be performed on tables in databases. For example, a table may be queried for records that contain specific values in one or more fields of the table. In some cases, a column in a table can be configured to stored values calculated based on values in other columns of the table. For instance, a table may have a first column for storing a quantity of a product sold, a second column for storing a unit price of the product, and a third column configured to store the total amount sold (i.e., the product of the quantity and the unit price). This allows an additional field of data on which queries can be made.

SUMMARY

In some embodiments, a non-transitory machine-readable medium stores a program. The program receives from a client device a request for data stored in a database categorized based on a calculated dimension. The program further generates the calculated dimension based on a subset of the data stored in the database. The program also generates an intermediary data structure by combining the calculated dimension with the data stored in the database. The program further generates results for the request by aggregating the data in the intermediary data structure based on the calculated dimension. The program also provides the results for the request to the client device.

In some embodiments, the data in the database may include a set of records organized according to a plurality of fields. The calculated dimension may be defined by a calculated dimension definition that specifies a set of fields from the plurality of fields and a set of operations for deriving values from the values in the set of fields for the calculated dimension. The program may further retrieve the calculated dimension definition from a storage configured to store calculated dimension definitions. The plurality of fields may include a plurality of dimensions. The set of fields of the calculated dimension definition may include a first dimension in the plurality of dimensions and a second dimension in the plurality of dimensions. The set of operations of the calculated dimension definition may include an operation for concatenating values in the first dimension and the second dimension. Generating the calculated dimension may include retrieving from the database the first dimension and the second dimension of the set of records, iterating through each record in the retrieved set of records and generating, for each record in the retrieved set of records, a dimension value for the calculated dimension that is associated with the record by concatenating values in the first dimension of the record and the second dimension of the record.

In some embodiments, the set of fields of the calculated dimension definition may include a dimension in the plurality of dimensions. The set of operations of the calculated dimension definition may include an operation for translating values in the dimension from a first plurality of values to a second plurality of values based on a defined mapping. Generating the calculated dimension may include retrieving from the database the dimension of the set of records, iterating through each record in the retrieved set of records, and generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

In some embodiments, the plurality of fields may include a set of measures. The set of fields of the calculated dimension definition may include a measure in the set of measures. The set of operations of the calculated dimension definition may include an operation for determining values in the dimension based on values in the measure. Generating the calculated dimension may include retrieving from the database the measure of the set of records, iterating through each record in the retrieved set of records, and generating, for each record in the retrieved set of records, a dimension value for the calculated dimension that is associated with the record by determining a value from a plurality of values based on a value of the measure of the record and using the value as the dimension value.

In some embodiments, the program may further, after providing the results, destroying the calculated dimension. The program may also provide a tool for creating calculated dimensions to the client device and receive the calculated dimension definition from the user of the client device via the tool.

In some embodiments, a method, performed by a device, receives from a client device a request for data stored in a database categorized based on a calculated dimension. The method further generates the calculated dimension based on a subset of the data stored in the database. The method also generates an intermediary data structure by combining the calculated dimension with the data stored in the database. The method further generates results for the request by aggregating the data in the intermediary data structure based on the calculated dimension. The method also provides the results for the request to the client device.

In some embodiments, the data in the database may include a set of records organized according to a plurality of fields. The calculated dimension may be defined by a calculated dimension definition that specifies a set of fields from the plurality of fields and a set of operations for deriving values from the values in the set of fields for the calculated dimension. The method may further retrieve the calculated dimension definition from a storage configured to store calculated dimension definitions. The plurality of fields may include a plurality of dimensions. The set of fields of the calculated dimension definition may include a first dimension in the plurality of dimensions and a second dimension in the plurality of dimensions. The set of operations of the calculated dimension definition may include an operation for concatenating values in the first dimension and the second dimension. Generating the calculated dimension may include retrieving from the database the first dimension and the second dimension of the set of records, iterating through each record in the retrieved set of records, and generating, for each record in the retrieved set of records, a dimension value for the calculated dimension that is associated with the record by concatenating values in the first dimension of the record and the second dimension of the record.

In some embodiments, the set of fields of the calculated dimension definition may include a dimension in the plurality of dimensions. The set of operations of the calculated dimension definition may include an operation for translating values in the dimension from a first plurality of values to a second plurality of values based on a defined mapping. Generating the calculated dimension may include retrieving from the database the dimension of the set of records, iterating through each record in the retrieved set of records, and generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

In some embodiments, the plurality of fields may include a set of measures. The set of fields of the calculated dimension definition may include a measure in the set of measures. The set of operations of the calculated dimension definition may include an operation for determining values in the dimension based on values in the measure. Generating the calculated dimension may include retrieving from the database the measure of the set of records, iterating through each record in the retrieved set of records, and generating, for each record in the retrieved set of records, a dimension value for the calculated dimension that is associated with the record by determining a value from a plurality of values based on a value of the measure of the record and using the value as the dimension value.

In some embodiments, the method may further, after providing the results, destroy the calculated dimension. The method may also provide a tool for creating calculated dimensions to the client device and receive the calculated dimension definition from the user of the client device via the tool.

In some embodiments, a system includes a set of processing units and a non-transitory machine-readable medium storing instructions. The instructions cause at least one processing unit to receive from a client device a request for data stored in a database categorized based on a calculated dimension. The instructions further cause the at least one processing unit to generate the calculated dimension based on a subset of the data stored in the database. The instructions also cause the at least one processing unit to generate an intermediary data structure by combining the calculated dimension with the data stored in the database. The instructions further cause the at least one processing unit to generate results for the request by aggregating the data in the intermediary data structure based on the calculated dimension. The instructions also cause the at least one processing unit to provide the results for the request to the client device.

In some embodiments, the data in the database may include a set of records organized according to a plurality of fields. The calculated dimension may be defined by a calculated dimension definition that specifies a set of fields from the plurality of fields and a set of operations for deriving values from the values in the set of fields for the calculated dimension. The instructions may further cause the at least one processing unit to retrieve the calculated dimension definition from a storage configured to store calculated dimension definitions. The plurality of fields may include a plurality of dimensions. The set of fields of the calculated dimension definition may include a first dimension in the plurality of dimensions and a second dimension in the plurality of dimensions. The set of operations of the calculated dimension definition may include an operation for concatenating values in the first dimension and the second dimension. Generating the calculated dimension may include retrieving from the database the first dimension and the second dimension of the set of records, iterating through each record in the retrieved set of records, and generating, for each record in the retrieved set of records, a dimension value for the calculated dimension that is associated with the record by concatenating values in the first dimension of the record and the second dimension of the record.

In some embodiments, the set of fields of the calculated dimension definition may include a dimension in the plurality of dimensions. The set of operations of the calculated dimension definition may include an operation for translating values in the dimension from a first plurality of values to a second plurality of values based on a defined mapping. Generating the calculated dimension may include retrieving from the database the dimension of the set of records, iterating through each record in the retrieved set of records, and generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

In some embodiments, the plurality of fields may include a set of measures. The set of fields of the calculated dimension definition may include a measure in the set of measures. The set of operations of the calculated dimension definition may include an operation for determining values in the dimension based on values in the measure. Generating the calculated dimension may include retrieving from the database the measure of the set of records, iterating through each record in the retrieved set of records, and generating, for each record in the retrieved set of records, a dimension value for the calculated dimension that is associated with the record by determining a value from a plurality of values based on a value of the measure of the record and using the value as the dimension value. In some embodiments, the instructions further cause the at least one processing unit to, after providing the results, destroy the calculated dimension.

The following detailed description and accompanying drawings provide a better understanding of the nature and advantages of the present invention.

BRIEF DESCRIPTION OF THE DRAWINGS

FIG. 2 illustrates an example table of data according to some embodiments.

FIG. 6 illustrates a table of results after an aggregation operation is performed on the table illustrated in FIG. 5 according to some embodiments.

FIG. 9 illustrates a dynamically calculated dimension created based on a dimension in the table illustrated in FIG. 2 and the calculated dimension definition illustrated in FIG. 8 according to some embodiments.

FIG. 10 illustrates a table generated by combining the tables illustrated in FIGS. 2 and 9 according to some embodiments.

FIG. 11 illustrates a table of results after an aggregation operation is performed on the table illustrated in FIG. 10 according to some embodiments.

FIG. 14 illustrates a dynamically calculated dimension created based on a measure in the table illustrated in FIG. 2 and the calculated dimension definition illustrated in FIG. 13 according to some embodiments.

FIG. 15 illustrates a table generated by combining the tables illustrated in FIGS. 2 and 14 according to some embodiments.

FIG. 16 illustrates a table of results after an aggregation operation is performed on the table illustrated in FIG. 15 according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for querying databases using dynamically calculated dimensions. In some embodiments, a system may receive requests from users (e.g., via client devices) for data in a database categorized based on a calculated dimension. To process such a request, the system may retrieve a calculated dimension definition associated with the calculated dimension referenced in the request. Then, the system can dynamically create the calculated dimension by generating values for the calculated dimension based on certain fields (e.g., measures, dimensions, etc.) of the data in the database. The calculated dimension may be combined with certain data (e.g., measures) in the database. The system can aggregate the certain data in the database based on values in the calculated dimension. In some cases, the system may provide the aggregated data to the user. In other cases, the system can further process the aggregated data and then provide the processed data to the user. After providing the requested data to the user, the system may destroy the calculated dimension.

The techniques described in the present application provide a number of benefits and advantages over conventional methods for calculating dimension and/or calculating fields. First, by dynamically generating calculated dimensions on the fly when processing a request and destroying the calculated dimensions after the processing of the request is finished, the system avoids having to add calculated dimensions to the database, thereby reducing the amount of storage space utilized in the database Second, using calculated dimension definitions to define calculated dimensions provides flexibility. For example, changes to calculated dimensions can be achieved by simply modifying the corresponding calculated dimension definition. As mentioned above, since the system is able to avoid having to add calculated dimensions to the database, the use of calculated dimension modifications allows the system to modify calculated dimensions without having to modify the database.

Figure 1:
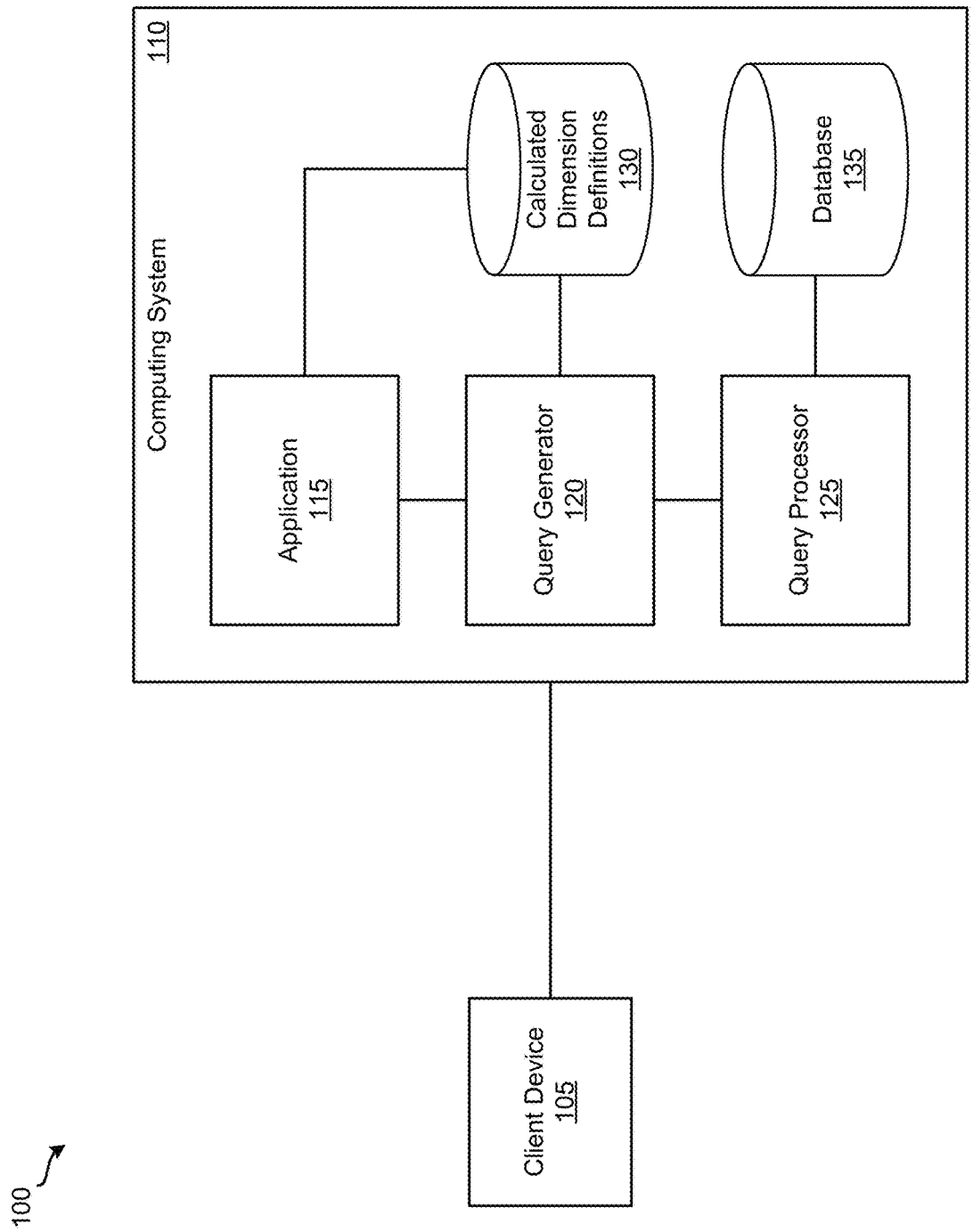
FIG. 1 illustrates a system for processing database queries using dynamically calculated dimensions according to some embodiments.

Third, because calculated dimensions are dynamically generated on the fly, changes to the underlying values in the fields in the database from which values for the calculated dimensions are derived are reflected in the calculated dimension when they are generated, thereby improving data quality of the calculated dimensions. For conventional calculated dimensions and/or calculated fields added to databases, the values in the calculated dimensions or calculated fields may need to be manually or periodically updated whenever changes are made to the underlying values in the fields used to calculate values for the calculated dimensions or calculated fields FIG. 1 illustrates a system 100 for processing database queries using dynamically calculated dimensions according to some embodiments. As shown, system 100 includes client device 105 and computer system 110. While FIG. 1 shows one client device 105, one of ordinary skill in the art will appreciate that any number of additional client devices configured similarly to client device 105 may be included in system 100.

Client device 105 is configured to communicate and interact with computer system 110. For example, a user of client device 105 may send computing system 110 a request for data stored in database 135 that is categorized based on a calculated dimension. In some cases, the request for such data includes a request for a visualization of the data. In response to the request, client device 105 may receive the requested data (or a visualization of the requested data) from computing system 110. Client device 105 can display the requested data on a display of client device 105 and/or further process the requested data.

A user of client device 105 can also create calculated dimension definitions that define calculated dimensions, which computing system 110 may utilize to categorize data stored in database 135. In some embodiments, the user of client device 105 uses a tool for creating calculated dimension definitions that is provided by computing system 110. In some embodiments, a calculated dimension definition specifies a unique identifier (e.g., a name) for the calculated dimension, a set of fields in a database (e.g., database 135), and a set of operations for deriving values from the values in the set of fields for the calculated dimension. After specifying a calculated dimension definition, the user of client device 105 sends the calculated dimension definition to computing system 110. In addition, the user of client device 105 may use the tool to edit or delete existing calculated dimension definitions.

As illustrated in FIG. 1, computing system 110 includes application 115, query generator 120, query processor 125, calculated dimension definition storage 130, and database 135. In some embodiments, a database management system (DBMS) provides access to and interacts with calculated dimension definitions storage 130 and/or database 135. In some such embodiments, query processor 125 is implemented as part of the DBMS. Calculated dimension definitions storage 130 is configured to stores calculated dimension definitions.

Database 135 stores data that may be used for generating calculated dimensions. In some embodiments, the data in database 135 is stored in one or more tables. Each table can include a plurality of fields. Each table can have one or more records that stores a value in each field in the plurality of fields. The plurality of fields may include one or more measures and one or more dimensions. In some embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. In some embodiments, calculated dimension definitions storage 130 and database 130 are implemented in a single physical storage while, in other embodiments, calculated dimension definitions storage 130 and database 135 may be implemented across several physical storages. While FIG. 1 shows calculated dimension definitions storage 130 and database 135 as part of computing system 110, one of ordinary skill in the art will recognize that calculated dimension definitions storage 130 and/or database 130 may be external to computing system 110 in some embodiments.

Application 115 is configured to communicate and interact with client device 105. For example, application 115 may receive from client device 105 a request for data stored in database 135 that is categorized based on a calculated dimension. In response to such a request, application 115 forwards the request to query generator 120. Upon receiving the results for the request from query generator 120, application 115 provides the results for the request to client device 105.

In addition, application 115 can provide client device 105 a tool for creating calculated dimension definitions. Through the tool, application 115 can receive from client device 105 a calculated dimension definition, which application 115 then stores in calculated dimension definitions storage 130. Application 115 can also receive edits to calculated dimension definitions or commands to delete calculated dimension definitions from client device 105 via the tool.

Application 115 may be any number of different types of applications. For instance, application 115 may be an analytics application, a data management application, a database management application, a human capital management application, an enterprise management application, a customer relationship management application, a financial management application, etc.

Query generator 120 is responsible for generating queries for data from database 135 and queries for generating calculated dimensions. For example, query generator 120 can receive from application 115 a request for data stored in database 135 that is categorized based on a calculated dimension. In response, query generator 120 accesses calculated dimension definitions storage 130 to retrieve the calculated dimension definition associated with the calculate dimension. Next, query generator 120 generates a query for generating the calculated dimension based on the calculated dimension definition. Query generator 120 also generates a set of queries for retrieving the requested data from database 135. Then, query generator 120 sends the generated queries to query processor 125 for execution. In some embodiments, query generator 120 generates a batch query that includes the generated queries and sends the batch query to the query processor 125 for execution as a single query. Upon receiving the results for the queries from query processor 125, query generator 120 sends the results for the queries to application 115.

Query processor 125 handles processing of queries. For instance, query processor 125 may receive from query generator 120 a batch query that includes a query for generating a calculated dimension and a set of queries for retrieving data from database 135. In such an example, query processor 125 first processes the query for generating the calculated dimension and then processes the set of queries for retrieving the requested data from database 135. Next, query processor 125 combines the results for the query for generating the calculated dimension with the results for the set of queries for retrieving the requested data from database 135. Query processor 125 then performs an aggregation operation on the combined results and sends the aggregated results to query generator 120. Finally, query processor 125 destroys the calculated dimension.

The following describes several example operations of system 100 in order to provide further details about system 100. First, an example operation of system 100 will now be described by reference to FIGS. 1-7. FIG. 2 illustrates an example table 200 of data according to some embodiments. Specifically, the data shown in table 200 of FIG. 2 will be used as the data stored in database 135 for this example. As shown, table 200 includes four fields 205-220. Field 205 is a dimension that stores country values (U.S., Canada, and Japan in this example). Field 210 is a dimension that stores product values (tennis shoes, running shoes, shorts, and hats in this example). Field 215 is a dimension that stores version values (actual and forecast in this example). Field 220 is a measure that stores profit values in terms of numbers that represent millions of dollars ($M).

Figure 3:
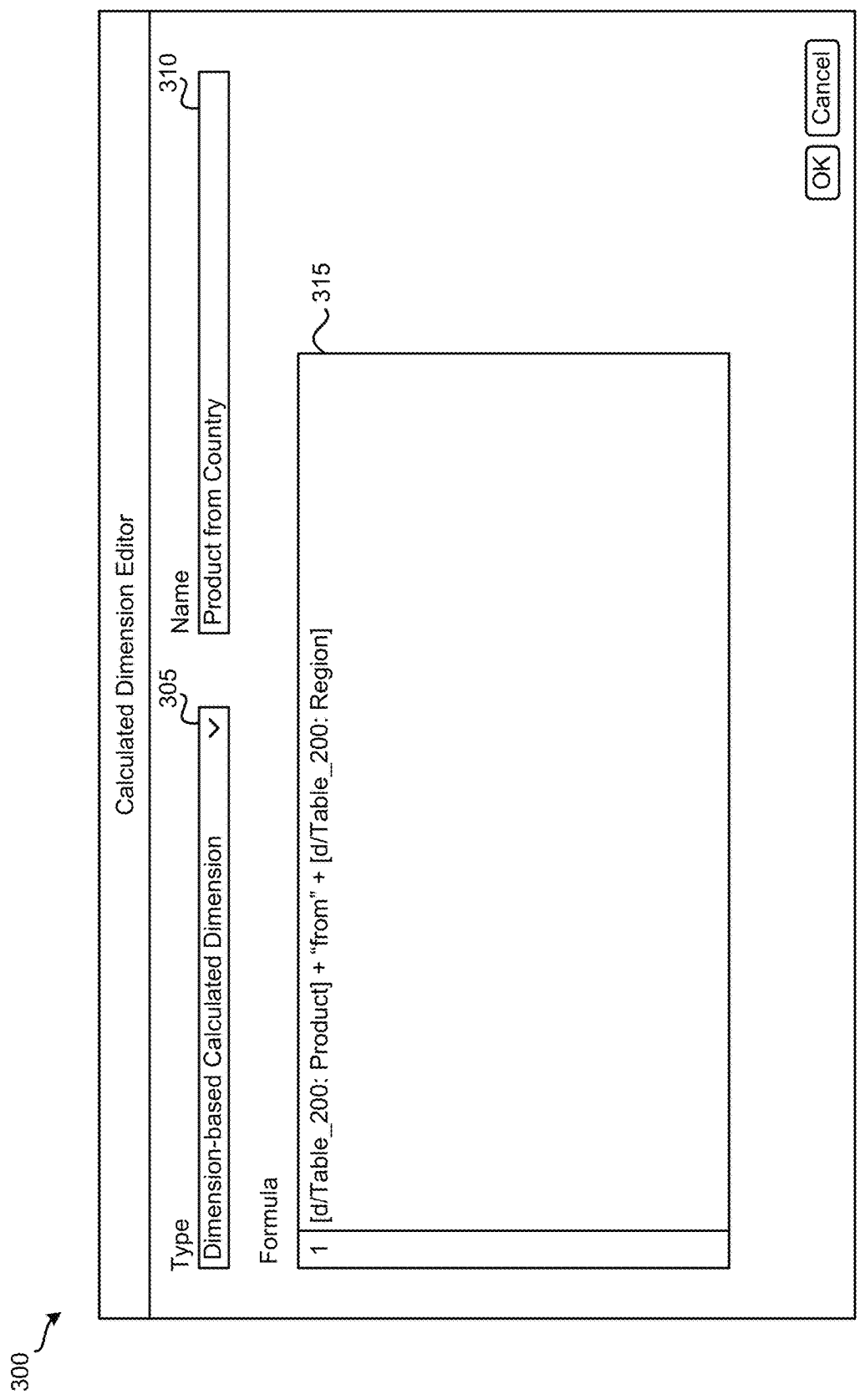
FIG. 3 illustrates an example calculated dimension definition according to some embodiments.

FIG. 3 illustrates an example calculated dimension definition according to some embodiments. In particular, FIG. 3 shows a GUI 300 of a tool provided by application 115 to client device 105. The tool, which a user of client device 105 used in this example to create the depicted calculated dimension definition, is for creating calculated dimension definitions. As shown, GUI 300 includes input controls 305-315. Input control 305 (e.g., a drop-down list) is for specifying a type of calculated dimension, input control 310 (e.g., a text box) is for specifying a name for the calculated dimension, and input control 315 (e.g., a text box) is for specifying a formula for generating values for the calculated dimension. As shown, the user of client device 105 in this example has specified a dimension-based calculated dimension as the type of calculated dimension, "Product from Country" as the name of the calculated dimension, and a formula that generates values for the calculated dimension by concatenating values of the Product dimension in table 200 (i.e., field 210), the string "from", and values of the Region dimension in table 200 (i.e., field 205).

The example operation starts by client device 105 sending application 115 a request for a visualization of profit values from table 200 filtered on the "Actual" version of profit values and categorized by a calculated dimension defined by the calculated dimension definition illustrated in FIG. 3. When application 115 receives the request from client device 105, application 115 forwards the request to query generator 120.

Once query generator 120 receives the request from application 115, query generator 120 accesses calculated dimension definitions storage 130 to retrieve the calculated dimension definition associated with the calculate dimension (i.e., the calculated dimension definition shown in FIG. 3). Query generator 120 then generates a first query for generating the calculated dimension based on the calculated dimension definition. Since the type of calculated dimension in this example is a dimension-based calculated dimension, the first query is configured to retrieve the dimensions specified in the calculated dimension definition from table 200, which are the Product dimension (i.e., field 210) and the Region dimension (i.e., field 205). The first query is also configured to generate values for the calculated dimension based on the formula specified in the calculated dimension definition.

Next, query generator 120 generates a second query for retrieving the requested data from database 135. For this example, the requested data from databased 135 includes the actual profit values from table 200. Thus, the second query generated by query generator 120 is configured to retrieve the values from the Profit measure in table 200 with a filter for records having the value "Actual" in the Version dimension. In addition, the second query is configured to retrieve the dimensions used in the calculated dimension (i.e., the Product dimension and the Region dimension). Query generator 120 sends the first and second queries as a batch query to query processor 125 for execution as a single query.

Upon receiving the batch query from query generator 120, query processor 125 processes the batch query by first executing the first query for generating the calculated dimension. Executing the first query causes query processor 125 to retrieve from table 200 the Region dimension (i.e., field 205) and the Product dimension (i.e., field 210); iterate through each record of the retrieved Product dimension and Region dimension; and generate, for each record, a dimension value for the calculated dimension that is associated with the record by concatenating the value in the Product dimension of the record, the string "from", and the value in the Region dimension of the record.

Figure 4:
FIG. 4 illustrates a dynamically calculated dimension created based on dimensions in the table illustrated in FIG. 2 and the calculated dimension definition illustrated in FIG. 3 according to some embodiments.

FIG. 4 illustrates a dynamically calculated dimension created based on dimensions in the table illustrated in FIG. 2 and the calculated dimension definition illustrated in FIG. 3 according to some embodiments. Specifically, FIG. 4 shows a table 400 that includes fields 405-415. Field 405 is the Region dimension (i.e., field 205) from table 200. Field 410 is the Product dimension (i.e., field 210) from table 200. Field 415 is the calculated dimension. As shown, only records in table 200 that have the value "Actual" in the Version dimension are included in table 400. Additionally, for each record, the value in field 415 is generated by concatenating the value in the Product dimension of the record, the string "from", and the value in the Region dimension of the record.

Continuing with the example, query processor 125 then processes the second query for retrieving the requested data from database 135 by executing the second query. Executing the second query causes query processor 125 to retrieve the Region dimension (i.e., field 205), the Product dimension (i.e., field 210), and the Profit measure (i.e., field 220) from table 200 with a filter for records having the value "Actual" in the Version dimension. Next, query processor 125 combines the results of the first query (i.e., table 400) with the results of the second query into an intermediary data structure (e.g., a table). In this example, query processor 125 combines the results of the first and second queries by performing a join operation of the results of the first and second queries on the dimensions used in the calculated dimension, which are the Product dimension and the Region dimension.

Figure 5:
FIG. 5 illustrates a table generated by combining the tables illustrated in FIGS. 2 and 4 according to some embodiments.

FIG. 5 illustrates a table 500 generated by combining the tables illustrated in FIGS. 2 and 4 according to some embodiments. As shown, table 500 includes fields 505-520. Field 505 is the Region dimension (i.e., field 205) from table 200, field 510 is the Product dimension (i.e., field 210) from table 200, and field 515 is the Profit measure (i.e., field 220) from table 200. Field 520 is the calculated dimension (i.e., field 415) from table 400. In this example, table 500 is an intermediary table that query processor 125 generates by performing a join operation of the results of the first and second queries described above on the Product and Region dimensions. The records shown in table 500 are the results of the join operation.

Returning to the example, query processor 125 performs an aggregation operation on the intermediary data structure. For this example, query processor 125 performs an aggregation operation of the Profit measure on the calculated dimension. That is, query processor 125 aggregates profit values of records that have the same dimension value in the calculated dimension. In this case, none of the profit values are aggregated together because the records in table 500 each has a distinct dimension value in the calculated dimension. Once the aggregation operation is complete, query processor 125 generates results for the request by generating a table that includes the aggregated values and the corresponding dimension values of the calculate dimension. As such, query processor 125 generates a table with the aggregated profit values in the Profit measure and the corresponding dimension values in the calculated dimension from the intermediary data structure.

FIG. 6 illustrates a table 600 of results after an aggregation operation is performed on the table illustrated in FIG. 5 according to some embodiments. As shown, table 600 includes fields 605 and 610. Field 605 is the Profit measure (i.e., field 515) from table 500. Field 610 is the calculated dimension (i.e., field 520) from table 500. As mentioned above, query processor 125 did not aggregate any profit values during the aggregation operation because the records in table 500 each has a distinct dimension value in the calculated dimension. For this example, query processor 125 generates table 600 to include the Profit measure and calculated dimension from table 500.

Figure 7:
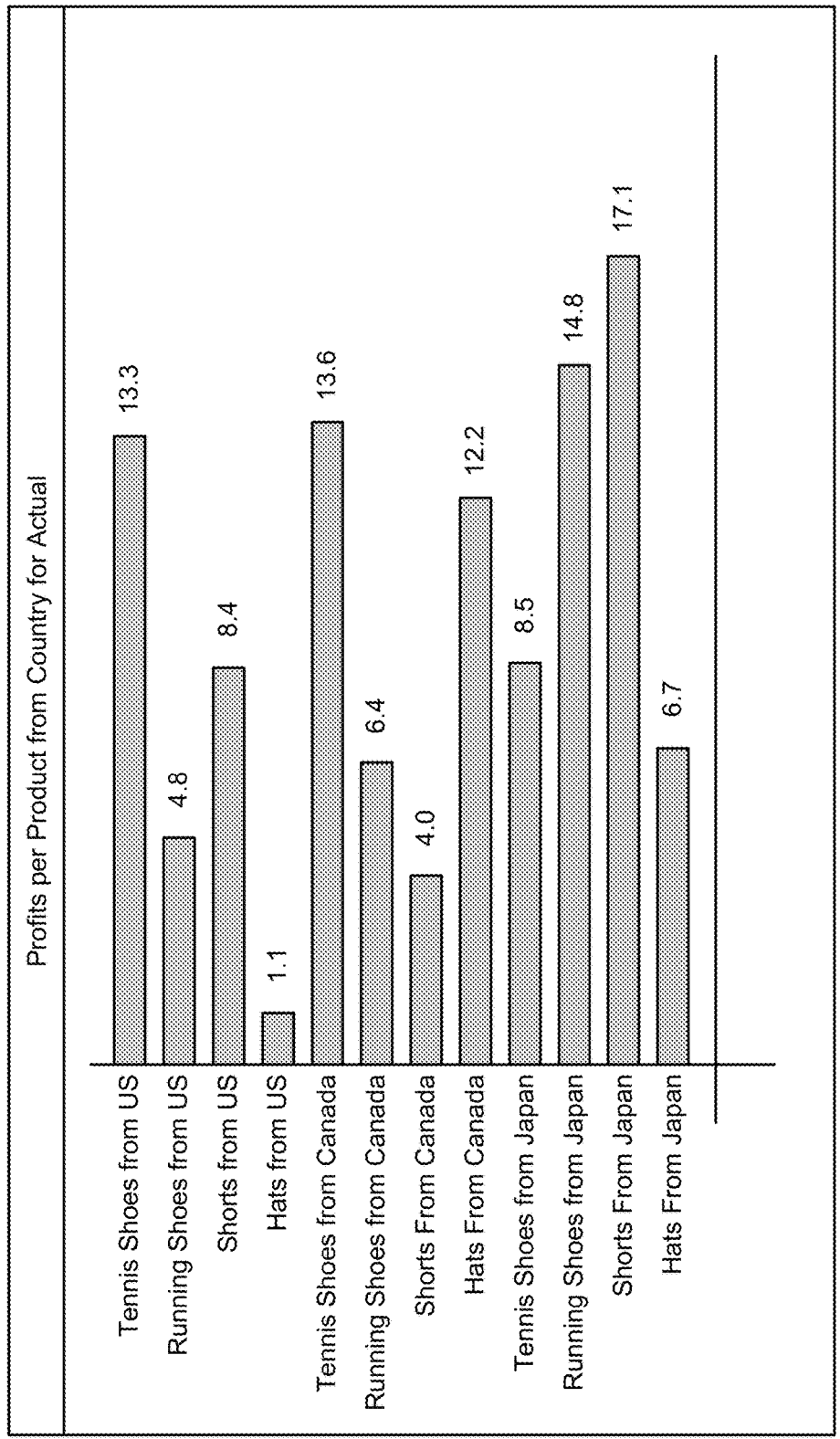
FIG. 7 illustrates a visualization generated based on the table illustrated in FIG. 6 according to some embodiments.

Continuing with the example, query processor 125 sends the results for the request (i.e., table 600) to query generator 120. After sending the results to query generator 120, query processor 125 destroys the calculated dimension (e.g., table 400 and table 500). Query generator 120 receives the results for the request from query processor 125 and forwards it to application 115. When application 115 receives the results for the request, application 115 generates a visualization based on the results for the request that shows actual profit values from table 200 filtered on the "Actual" version of profit values and categorized by the calculated dimension defined by the calculated dimension definition illustrated in FIG. 3. Application 115 then provides the visualization to client device 105. FIG. 7 illustrates a visualization 700 generated based on the table illustrated in FIG. 6 according to some embodiments. As shown, visualization 700 includes a bar graph depicting the profit values in the Profit measure categorized by dimension values in the calculated dimension shown in table 600.

Figure 8:
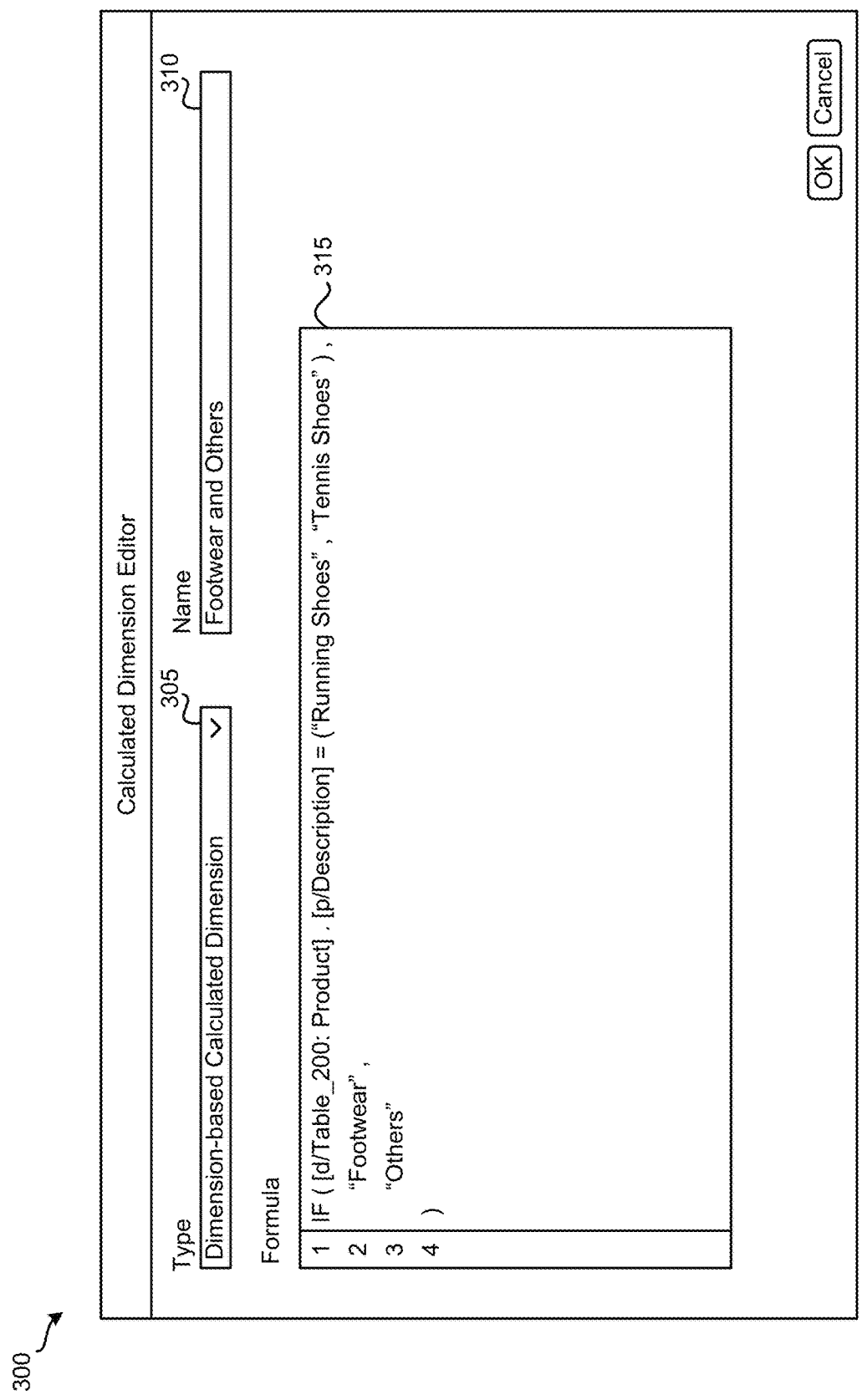
FIG. 8 illustrates another example calculated dimension definition according to some embodiments.

Another example operation of system 100 will now be described by reference to FIGS. 1, 2, and 6-12. In this example, table 200 of FIG. 2 will also be used as the data stored in database 135. FIG. 8 illustrates another example calculated dimension definition according to some embodiments. Specifically, FIG. 8 shows GUI 300 of the tool illustrated in FIG. 3. As shown, for this example, the user of client device 105 has specified a dimension-based calculated dimension as the type of calculated dimension, "Footwear and Others" as the name of the calculated dimension, and a formula that generates values for the calculated dimension by translating values of the Product dimension in table 200 (i.e., field 210) to a different set of values ("Footwear" and "Others" in this example) based on a defined mapping. In particular, the defined mapping maps values "Running Shoes" and "Tennis Shoes" in the Product dimension of table 200 to the value "Footwear" and maps all other values in the Product dimension table 200 to the value "Others". FIG. 8 shows an example of creating a calculated dimension by translating values in a dimension from one set of values to another set of values. One of ordinary skill in the art will understand that any number of different translation function may be specified for this type of dimension-based calculated dimension. For instance, a dimension-based calculated dimension can specify that values in a dimension storing string values having three characters are translated to "Abbreviation" and string values not having three characters are translated to "Others".

The example operation begins by client device 105 sending application 115 a request for a visualization of actual profit values from table 200 filtered on the "Actual" version of profit values and categorized by a calculated dimension defined by the calculated dimension definition illustrated in FIG. 8. Upon receiving the request from client device 105, application 115 forwards the request to query generator 120. In response, query generator 120 accesses calculated dimension definitions storage 130 to retrieve the calculated dimension definition associated with the calculate dimension (i.e., the calculated dimension definition shown in FIG. 8). Next, query generator 120 generates a first query for generating the calculated dimension based on the calculated dimension definition. As the type of calculated dimension in this example is a dimension-based calculated dimension, the first query is configured to retrieve the dimensions specified in the calculated dimension definition from table 200, which is the Product dimension (i.e., field 210) for this example. The first query is further configured to generate values for the calculated dimension based on the formula specified in the calculated dimension definition.

After generating the first query, query generator 120 generates a second query for retrieving the requested data from database 135. The requested data from databased 135 in this example includes the actual profit values from table 200. As such, the second query generated by query generator 120 is configured to retrieve the values from the Profit measure in table 200 with a filter for records having the value "Actual" in the Version dimension. The second query is additionally configured to retrieve the dimensions used in the calculated dimension (i.e., the Product dimension). Then, query generator 120 sends the first and second queries as a batch query to query processor 125 for execution as a single query.

After receiving the batch query, query processor 125 starts processing the batch query by executing the first query for generating the calculated dimension. Executing the first query causes query processor 125 to retrieve from table 200 the Product dimension (i.e., field 210) for only the records having the value "Actual" in the Version dimension; iterate through each record of the retrieved Product dimension; and generate, for each record, a dimension value for the calculated dimension that is associated with the record by translating the value in the Product dimension of the record to a different value based on the mapping defined in the calculated dimension definition.

FIG. 9 illustrates a dynamically calculated dimension created based on a dimension in the table illustrated in FIG. 2 and the calculated dimension definition illustrated in FIG. 8 according to some embodiments. In particular, FIG. 9 shows a table 900 that includes fields 905 and 910. Field 905 is the Product dimension (i.e., field 210) from table 200. Field 910 is the calculated dimension. As illustrated in FIG. 9, only records in table 200 that have the value "Actual" in the Version dimension are included in table 900. Further, for each record, the value in field 910 is generated by translating the value in the Product dimension of the record to a different value based on the mapping defined in the calculated dimension definition and storing the translated value in field 910. Specifically, the values "Running Shoes" and "Tennis Shoes" in the Product dimension are translated to the value "Footwear" and all other values in the Product dimension are translated to the value "Others".

Returning to the example, after processing the first query, query processor 125 processes the second query for retrieving the requested data from database 135 by executing the second query. Executing the second query causes query processor 125 to retrieve from table 200 the Region dimension (i.e., field 205), the Product dimension (i.e., field 210), and the Profit measure (i.e., field 220) with a filter for records having the value "Actual" in the Version dimension. Query processor 125 then combines the results of the first query (i.e., table 900) with the results of the second query into an intermediary data structure (e.g., a table). For this example, query processor 125 combines the results of the first and second queries by performing a join operation of the results of the first and second queries on the dimension used in the calculated dimension, which is the Product dimension.

FIG. 10 illustrates a table 1000 generated by combining the tables illustrated in FIGS. 2 and 9 according to some embodiments. As illustrated, table 1000 includes fields 1005-1015. Field 1005 is the Product dimension (i.e., field 210) from table 200 and field 1010 is the Profit measure (i.e., field 220) from table 200. Field 1015 is the calculated dimension (i.e., field 910) from table 900. For this example, table 1000 is an intermediary table that query processor 125 generates by performing a join operation of the results of the first and second queries described above on the Product dimension. The records shown in table 1000 are the results of the join operation.

Continuing with the example, query processor 125 then performs an aggregation operation on the values in the intermediary data structure. In this example, query processor 125 performs an aggregation operation of the Profit measure on the calculated dimension. That is, query processor 125 aggregates profit values of records that have the same dimension value in the calculated dimension. For this example, query processor 125 aggregates the profit values of records that have the value "Footwear" in field 1015 together and aggregates the profit values of records that have the value "Others" in field 1015 together. After performing the aggregation operation, query processor 125 generates results for the request by generating a table that includes the aggregated values and the corresponding dimension values of the calculated dimension. Therefore, query processor 125 generates a table with the aggregated profit values in the Profit measure and the corresponding dimension values in the calculated dimension from the intermediary data structure.

FIG. 11 illustrates a table 1100 of results after an aggregation operation is performed on the table illustrated in FIG. 10 according to some embodiments. As illustrated in FIG. 11, table 1100 includes fields 1105 and 1110. Field 1105 is the Profit measure (i.e., field 1010) from table 1000. Field 1110 is the calculated dimension (i.e., field 1015) from table 1000. As described above, query processor 125 aggregated the profit values of records that have the value "Footwear" in field 1015 together and aggregated the profit values of records that have the value "Others" in field 1015 together. In this example, query processor 125 generates table 1100 to include the aggregated profit values of the Profit measure and the corresponding dimension values in the calculated dimension from table 1000.

Figure 12:
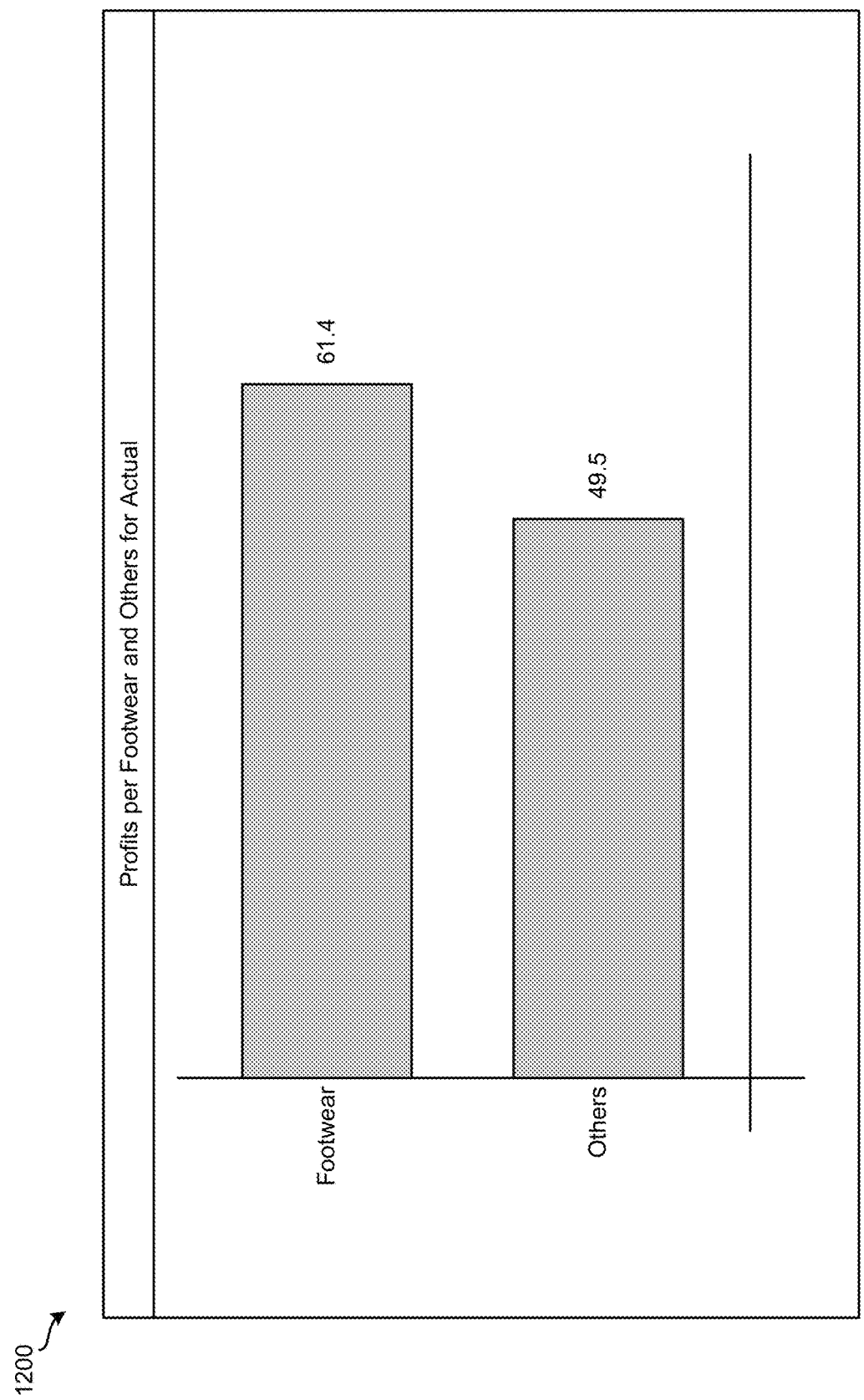
FIG. 12 illustrates a visualization generated based on the table illustrated in FIG. 11 according to some embodiments.

Returning to the example, query processor 125 sends the results for the request (i.e., table 1100) to query generator 120. After sending the results to query generator 120, query processor 125 destroys the calculated dimension (e.g., table 900 and table 1000). When query generator 120 receives the results for the request from query processor 125, query generator 120 forwards it to application 115. Upon receiving the results for the request, application 115 generates a visualization based on the results for the request that shows actual profit values from table 200 filtered on the "Actual" version of profit values and categorized by the calculated dimension defined by the calculated dimension definition illustrated in FIG. 8. Next, application 115 provides the visualization to client device 105. FIG. 12 illustrates a visualization 1200 that includes the results in the table illustrated in FIG. 11 according to some embodiments. As illustrated, visualization 1200 includes a bar graph depicting the profit values in the Profit measure categorized by dimension values in the calculated dimension shown in table 1100.

Figure 13:
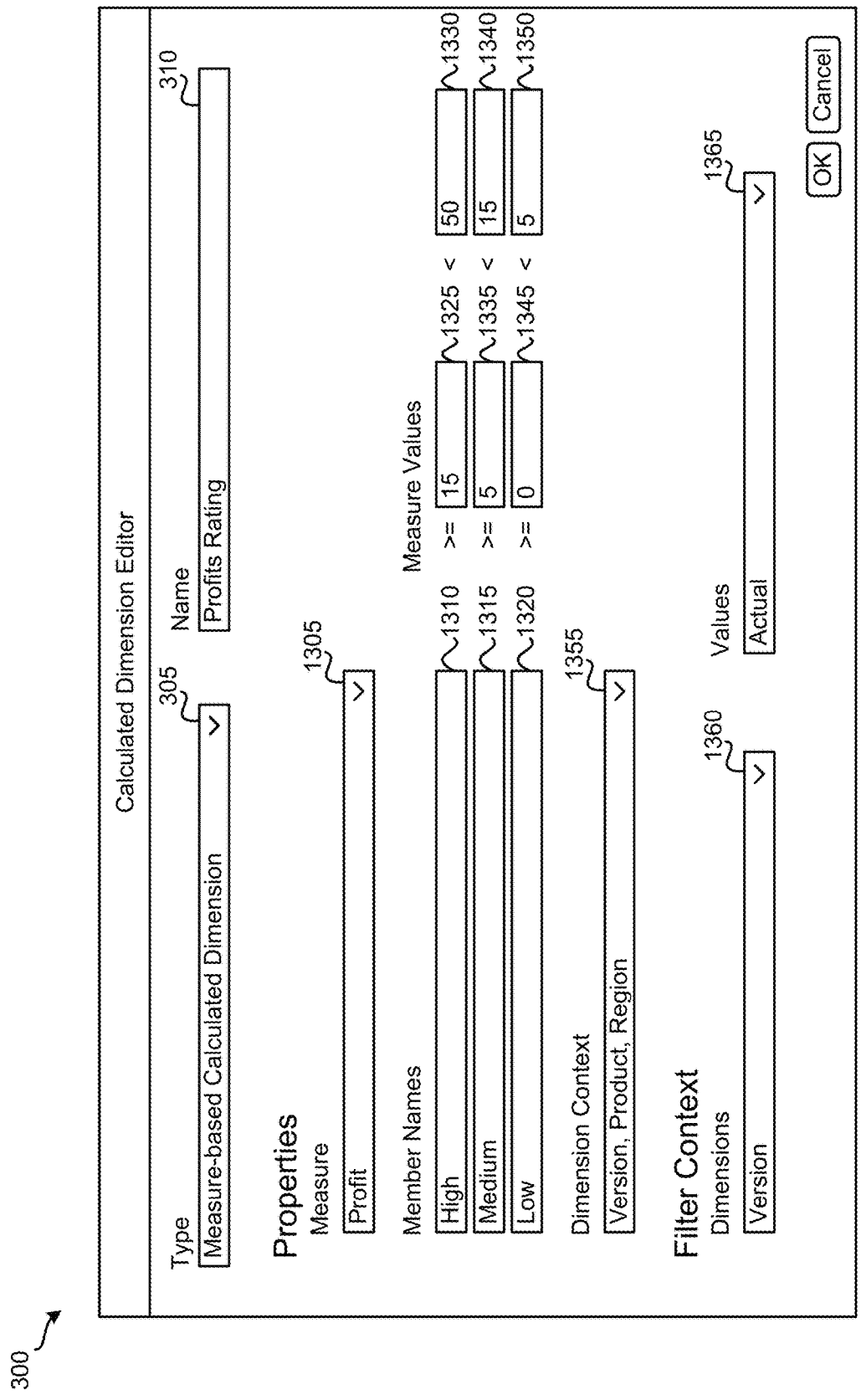
FIG. 13 illustrates another example calculated dimension definition according to some embodiments.

Yet another example operation of system 100 will now be described by reference to FIGS. 1, 2, and 13-17. For this example, table 200 of FIG. 2 will still be used as the data stored in database 135. FIG. 13 illustrates another example calculated dimension definition according to some embodiments. In particular, FIG. 13 shows GUI 300 of the tool illustrated in FIG. 3. As illustrated in FIG. 13 the user of client device 105 has specified, in this example, a measure-based calculated dimension as the type of calculated dimension and "Profits Rating" as the name of the calculated dimension. For a measure-based calculated dimension, a user may specify properties and, optionally, a filter context for the measure-based calculated dimension. The properties can include a measure in a database (e.g., the Profit measure in database 135), several member names and a range of values associated with member name, and a dimension context. In some embodiments, a dimension context specifies one or more dimensions to use for a combination operation. A filter context may include a dimension and a dimension value that are used as a filter on the calculated dimension.

In this example, the user of client device 105 has specified, via input control 1305, the Profit measure in table 200 as one of the properties. In addition, the user of client device 105 has specified, via input controls 1310-1320, three member names: "High," "Medium," and "Low." A ranges of less than fifty and greater than or equal to fifteen has been specified, via input controls 1325 and 1330, for the "High" member name. A ranges of less than fifteen and greater than or equal to five has been specified, via input controls 1335 and 1340, for the "Medium" member name. A ranges of less than five and greater than or equal to zero has been specified, via input controls 1345 and 1350, for the "Low" member name. The user of client device 105 has additionally specified, via input control 1355, a dimension context property that includes the Version dimension, the Product dimension, and the Region dimension in table 200. Finally, the user of the client device 105 has specified, via input controls 1360 and 1365, a filter context that include the Version dimension and a dimension value of "Actual."

The example operation starts by client device 105 sending application 115 a request for a visualization of profit values from table 200 filtered on the "Actual" version of profit values and categorized by a calculated dimension defined by the calculated dimension definition illustrated in FIG. 13. When application 115 receives the request from client device 105, application 115 forwards the request to query generator 120.

After query generator 120 receives the request from application 115, query generator 120 accesses calculated dimension definitions storage 130 to retrieve the calculated dimension definition associated with the calculate dimension (i.e., the calculated dimension definition shown in FIG. 13). Then, query generator 120 generates a first query for generating the calculated dimension based on the calculated dimension definition. Because the type of calculated dimension for this example is a measure-based calculated dimension, the first query is configured to retrieve the measures specified in the calculated dimension definition, which is the Profit measure (i.e., field 220), from table 200 as well as the dimensions for the dimension context specified in the calculated dimension definition, which are the Region dimension, the Product dimension, and the Version dimension. Further, query generator 120 applies the filter context specified in the calculation dimension definition to the first query by configuring the first query to additionally retrieve only records having the value "Actual" in the Version dimension. The first query is also configured to generate values for the calculated dimension based on the properties specified in the calculated dimension definition.

Next, query generator 120 generates a second query for retrieving the requested data from database 135. For this example, the requested data from databased 135 includes the actual profit values from table 200. Hence, the second query generated by query generator 120 is configured to retrieve the values from the Profit measure in table 200. In addition, the second query is configured to retrieve the dimensions specified in the dimension context of the calculated dimension (i.e., the Product dimension, the Region dimension, and the Version dimension). Query generator 120 sends the first and second queries as a batch query to query processor 125 for execution as a single query.

Once query processor 125 receives the batch query from query generator 120, query processor 125 processes the batch query by first executing the first query for generating the calculated dimension. Executing the first query causes query processor 125 to retrieve from table 200 the Region dimension (i.e., field 205), the Product dimension (i.e., field 210), the Version dimension (i.e., field 215), and the Profit measure for only the records having the value "Actual" in the Version dimension; iterate through each record of the retrieved Profit measure; and generate, for each record, a dimension value for the calculated dimension that is associated with the record by determining a member name specified in the properties of the calculated dimension definition based on the value of the Profit measure of the record. In this example, if the value of the Profit measure of a record is less than fifty and greater than or equal to fifteen, the dimension value for the calculated dimension that is associated with the record is determined to be "High." If the value of the Profit measure of a record is less than 15 and greater than or equal to five, the dimension value for the calculated dimension that is associated with the record is determined to be "Medium." If the value of the Profit measure of a record is less than five and greater than or equal to zero, the dimension value for the calculated dimension that is associated with the record is determined to be "Low."

FIG. 14 illustrates a dynamically calculated dimension created based on a measure in the table illustrated in FIG. 2 and the calculated dimension definition illustrated in FIG. 13 according to some embodiments. Specifically, FIG. 14 shows a table 1400 that includes fields 1405-1420. Field 1405 is the Region dimension (i.e., field 205) from table 200. Field 1410 is the Product dimension (i.e., field 210) from table 200. Field 1415 is the Version dimension (i.e., field 215) from table 200. Field 1420 is the calculated dimension. As shown, only records in table 200 that have the value "Actual" in the Version dimension are included in table 1400. Additionally, for each record, the value in field 1420 is generated by determining a member name specified in the properties of the calculated dimension definition based on the value of the Profit measure of the record and the ranges of values associated with the member names and using the member name as the value in field 1420.

Continuing with the example, query processor 125 then processes the second query for retrieving the requested data from database 135 by executing the second query. Executing the second query causes query processor 125 to retrieve the Region dimension (i.e., field 205), the Product dimension (i.e., field 210), the Version dimension (i.e., field 215), and the Profit measure (i.e., field 220) from table 200. Next, query processor 125 combines the results of the first query (i.e., table 1400) with the results of the second query into an intermediary data structure (e.g., a table). For this example, query processor 125 combines the results of the first and second queries by performing a join operation of the results of the first and second queries on the dimensions specified in the dimension context of the calculated dimension definition, which are the Product dimension, the Region dimension, and the Version dimension.

FIG. 15 illustrates a table 1500 generated by combining the tables illustrated in FIGS. 2 and 14 according to some embodiments. As shown, table 1500 includes fields 1505-1525. Field 1505 is the Region dimension (i.e., field 205) from table 200, field 1510 is the Product dimension (i.e., field 210) from table 200, field 1515 is the Version dimension (i.e., field 215) from table 200, and field 1520 is the Profit measure (i.e., field 220) from table 200. Field 1525 is the calculated dimension (i.e., field 1420) from table 1400. In this example, table 1500 is an intermediary table that query processor 125 generates by performing a join operation of the results of the first and second queries described above on the Product, Region, and Version dimensions. The records shown in table 1500 are the results of the join operation.

Returning to the example, query processor 125 performs an aggregation operation on the intermediary data structure. For this example, query processor 125 performs an aggregation operation of the Profit measure on the calculated dimension. That is, query processor 125 aggregates profit values of records that have the same dimension value in the calculated dimension. In this example, query processor 125 aggregates the profit values of records that have the value "High" in field 1525 together, aggregates the profit values of records that have the value "Medium" in field 1525 together, and aggregates the profit values of records that have the value "Low" in field 1525 together. Once query processor 125 performs the aggregation operation, query processor 125 then generates results for the request by generating a table that includes the aggregated values and the corresponding dimension values of the calculated dimension. As such, query processor 125 generates a table with the aggregated profit values in the Profit measure and the corresponding dimension values in the calculated dimension from the intermediary data structure.

FIG. 16 illustrates a table 1600 of results after an aggregation operation is performed on the table illustrated in FIG. 15 according to some embodiments. As shown, table 1600 includes fields 1605 and 1610. Field 1605 is the Profit measure (i.e., field 1520) from table 1500. Field 1610 is the calculated dimension (i.e., field 1525) from table 1500. As mentioned above, query processor 125 aggregated the profit values of records that have the value "High" in field 1525 together, aggregated the profit values of records that have the value "Medium" in field 1525 together, and aggregated the profit values of records that have the value "Low" in field 1525 together. For this example, query processor 125 generates table 1600 to include the aggregated profit values of the Profit measure and the corresponding dimension values in the calculated dimension from table 1000.

Figure 17:
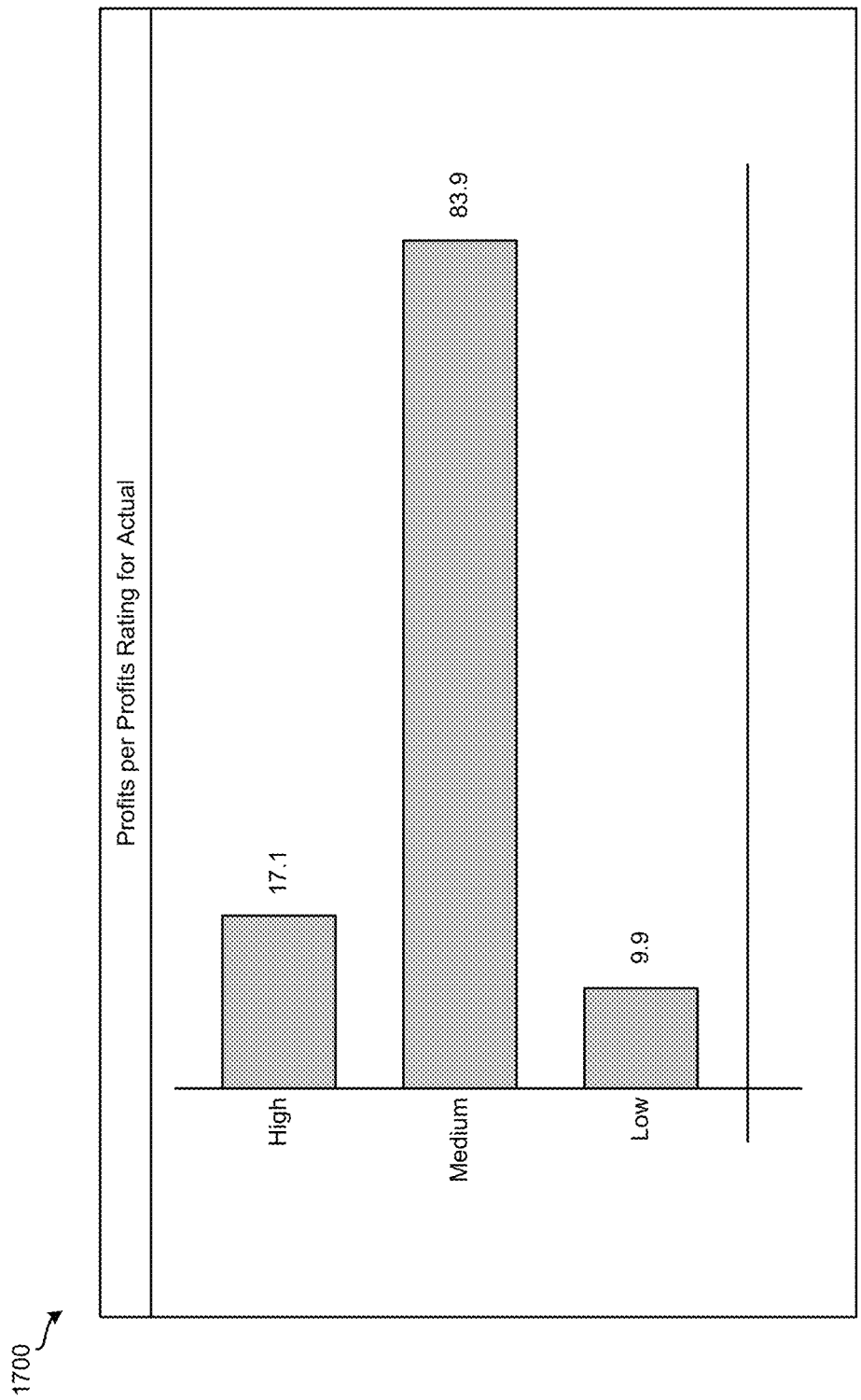
FIG. 17 illustrates a visualization generated based on the table illustrated in FIG. 16 according to some embodiments.

Continuing with the example, query processor 125 sends the results for the request (i.e., table 1600) to query generator 120. After sending the results to query generator 120, query processor 125 destroys the calculated dimension (e.g., table 1400 and table 1500). Query generator 120 receives the results for the request from query processor 125 and forwards it to application 115. When application 115 receives the results for the request, application 115 generates a visualization based on the results for the request that shows actual profit values from table 200 filtered on the "Actual" version of profit values and categorized by the calculated dimension defined by the calculated dimension definition illustrated in FIG. 13. Application 115 then provides the visualization to client device 105. FIG. 17 illustrates a visualization 1700 generated based on the table illustrated in FIG. 16 according to some embodiments. As shown, visualization 1700 includes a bar graph depicting the profit values in the Profit measure categorized by dimension values in the calculated dimension shown in table 1600.

Figure 18:
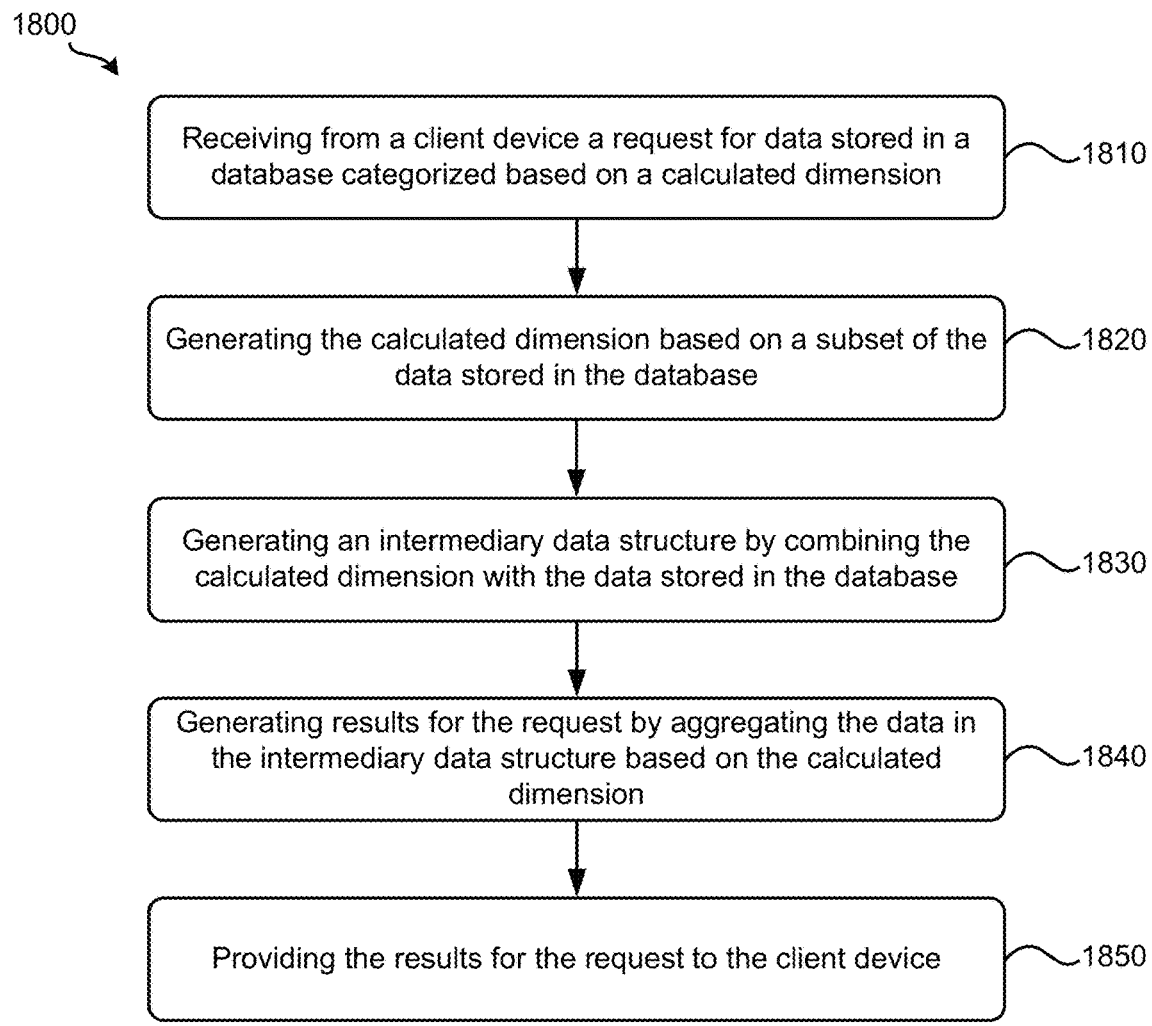
FIG. 18 illustrates a process for processing a query using a dynamically calculated dimension according to some embodiments.

FIG. 18 illustrates a process 1800 for processing a query using a dynamically calculated dimension according to some embodiments. In some embodiments, computing system 110 performs process 1800. Process 1800 begins by receiving, at 1810, from a client device a request for data stored in a database categorized based on a calculated dimension. Referring to FIG. 1 as an example, application 115 may receive a request for data stored in database 135 (e.g., profit values from table 200) that is categorized by a calculated dimension defined by a calculated dimension definition (e.g., a calculated dimension definition illustrated in FIG. 3, 8, or 13). When application 115 receives the request from client device 105, application 115 forwards the request to query generator 120. Query generator 120 may access calculated dimension definitions storage 130 to retrieve the calculated dimension definition associated with the calculate dimension. Then, query generator 120 can generate a first query for generating the calculated dimension based on the calculated dimension definition and a second query for retrieving the requested data from database 135. Query generator 120 may send the first and second queries as a batch query to query processor 125 for execution as a single query.

Next, process 1800 generates, at 1820, the calculated dimension based on a subset of the data stored in the database. Referring to FIG. 1 and continuing with the example above, query processor 125 may receive the batch query from query generator 120. In response, query processor 125 processes the batch query by first executing the first query for generating the calculated dimension based on the calculated dimension definition (e.g., a calculated dimension definition illustrated in FIG. 3, 8, or 13). Query processor 125 can then process the second query for retrieving the requested data from database 135 by executing the second query.

Process 1800 then generates, at 1830, an intermediary data structure by combining the calculated dimension with the data stored in the database. Referring to FIG. 1 and continuing with the example above, query processor 125 may combine (e.g., by performing a join operation) the results of the first query with the results of the second query into an intermediary data structure.

After 1830, process 1800 generates, at 1840, results for the request by aggregating the data in the intermediary data structure based on the calculated dimension. Referring to FIG. 1 and continuing with the example above, query processor 125 performs an aggregation operation on the intermediary data structure. For example, query processor 125 can performs an aggregation operation of a measure (e.g., the Profit measure shown in FIG. 5, 10, or 15) on the calculated dimension. In some embodiments, query processor 125 performs the aggregation operation by aggregating measure values of records that have the same dimension value in the calculated dimension. After performing the aggregation operation, query processor 125 may generate results for the request by generating a table that includes the aggregated values and the corresponding dimension values of the calculated dimension. Then, query processor 125 sends the results for the request to query generator 120, which forwards it to application 115. After sending the results to query generator 120, query processor 125 may destroy the calculated dimension. Finally, process 1800 provides, at 1850, the results for the request to the client device. Referring to FIG. 1 and continuing with the example above, when application 115 receives the results for the request, application 115 provides the visualization to client device 105.

The examples and embodiments described above discuss requests for data stored in a database that is categorized based on one calculated dimension. One of ordinary skill in the art will appreciate that requests can be for data stored in the database that is categorized based on one or more calculated dimensions, one or more dimensions in the database, or a combination thereof. In addition, FIGS. 2, 4-6, 9-11, and 14-16 illustrate the use of tables as a means for storing data. A table data structure is merely one example data structure that may be used to store data. One of ordinary skill in the art will realized that different data structure can be used in different embodiments.

Figure 19:
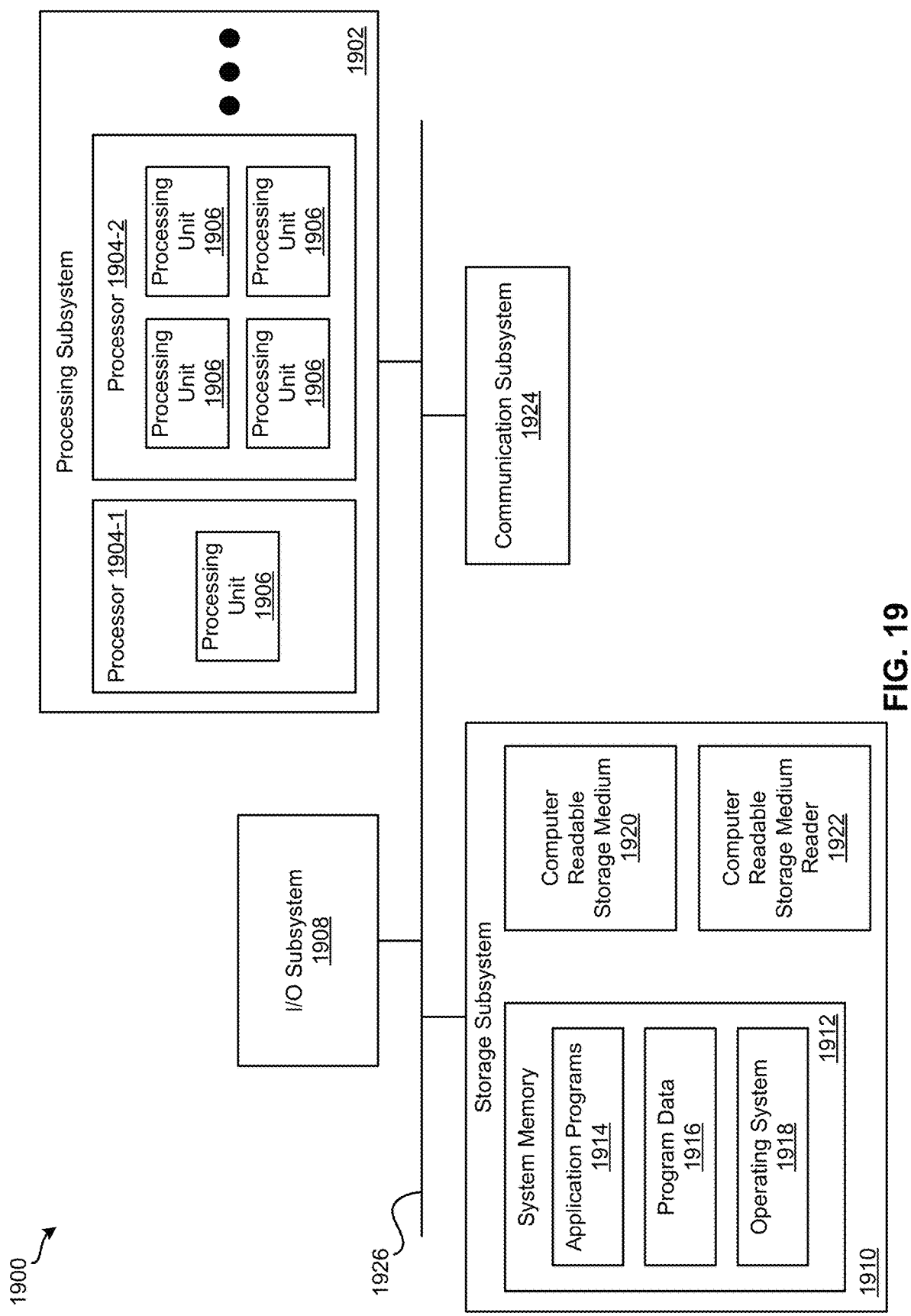
FIG. 19 illustrates an exemplary computer system, in which various embodiments may be implemented.

FIG. 19 illustrates an exemplary computer system 1900 for implementing various embodiments described above. For example, computer system 1900 may be used to implement client device 105 and computing system 110. Computer system 1900 may be a desktop computer, a laptop, a server computer, or any other type of computer system or combination thereof. Some or all elements of application 1150, query generator 120, query processor 125, or combinations thereof can be included or implemented in computer system 1900. In addition, computer system 1900 can implement many of the operations, methods, and/or processes described above (e.g., process 1800). As shown in FIG. 19, computer system 1900 includes processing subsystem 1902, which communicates, via bus subsystem 1926, with input/output (I/O) subsystem 1908, storage subsystem 1910 and communication subsystem 1924.

Bus subsystem 1926 is configured to facilitate communication among the various components and subsystems of computer system 1900. While bus subsystem 1926 is illustrated in FIG. 19 as a single bus, one of ordinary skill in the art will understand that bus subsystem 1926 may be implemented as multiple buses. Bus subsystem 1926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1902, which can be implemented as one or more integrated circuits (e.g., a conventional microprocessor or microcontroller), controls the operation of computer system 1900. Processing subsystem 1902 may include one or more processors 1904. Each processor 1904 may include one processing unit 1906 (e.g., a single core processor such as processor 1904-1) or several processing units 1906 (e.g., a multicore processor such as processor 1904-2). In some embodiments, processors 1904 of processing subsystem 1902 may be implemented as independent processors while, in other embodiments, processors 1904 of processing subsystem 1902 may be implemented as multiple processors integrate into a single chip or multiple chips. Still, in some embodiments, processors 1904 of processing subsystem 1902 may be implemented as a combination of independent processors and multiple processors integrated into a single chip or multiple chips.

In some embodiments, processing subsystem 1902 can execute a variety of programs or processes in response to program code and can maintain multiple concurrently executing programs or processes. At any given time, some or all of the program code to be executed can reside in processing subsystem 1902 and/or in storage subsystem 1910. Through suitable programming, processing subsystem 1902 can provide various functionalities, such as the functionalities described above by reference to process 1800, etc.

I/O subsystem 1908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1900 to a user or another device (e.g., a printer).

As illustrated in FIG. 19, storage subsystem 1910 includes system memory 1912, computer-readable storage medium 1920, and computer-readable storage medium reader 1922. System memory 1912 may be configured to store software in the form of program instructions that are loadable and executable by processing subsystem 1902 as well as data generated during the execution of program instructions. In some embodiments, system memory 1912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1912 may include different types of memory, such as static random access memory (SRAM) and/or dynamic random access memory (DRAM). System memory 1912 may include a basic input/output system (BIOS), in some embodiments, that is configured to store basic routines to facilitate transferring information between elements within computer system 1900 (e.g., during start-up). Such a BIOS may be stored in ROM (e.g., a ROM chip), flash memory, or any other type of memory that may be configured to store the BIOS.

As shown in FIG. 19, system memory 1912 includes application programs 1914 (e.g., application 115), program data 1916, and operating system (OS) 1918. OS 1918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1920 may be a non-transitory computer-readable medium configured to store software (e.g., programs, code modules, data constructs, instructions, etc.). Many of the components (e.g., application 115, query generator 120, and query processor 125) and/or processes (e.g., process 1800) described above may be implemented as software that when executed by a processor or processing unit (e.g., a processor or processing unit of processing subsystem 1902) performs the operations of such components and/or processes. Storage subsystem 1910 may also store data used for, or generated during, the execution of the software.

Storage subsystem 1910 may also include computer-readable storage medium reader 1922 that is configured to communicate with computer-readable storage medium 1920. Together and, optionally, in combination with system memory 1912, computer-readable storage medium 1920 may comprehensively represent remote, local, fixed, and/or removable storage devices plus storage media for temporarily and/or more permanently containing, storing, transmitting, and retrieving computer-readable information.

Computer-readable storage medium 1920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1924 serves as an interface for receiving data from, and transmitting data to, other devices, computer systems, and networks. For example, communication subsystem 1924 may allow computer system 1900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1924 may provide components configured for wired communication (e.g., Ethernet) in addition to or instead of components configured for wireless communication.

One of ordinary skill in the art will realize that the architecture shown in FIG. 19 is only an example architecture of computer system 1900, and that computer system 1900 may have additional or fewer components than shown, or a different configuration of components. The various components shown in FIG. 19 may be implemented in hardware, software, firmware or any combination thereof, including one or more signal processing and/or application specific integrated circuits.

Figure 20:
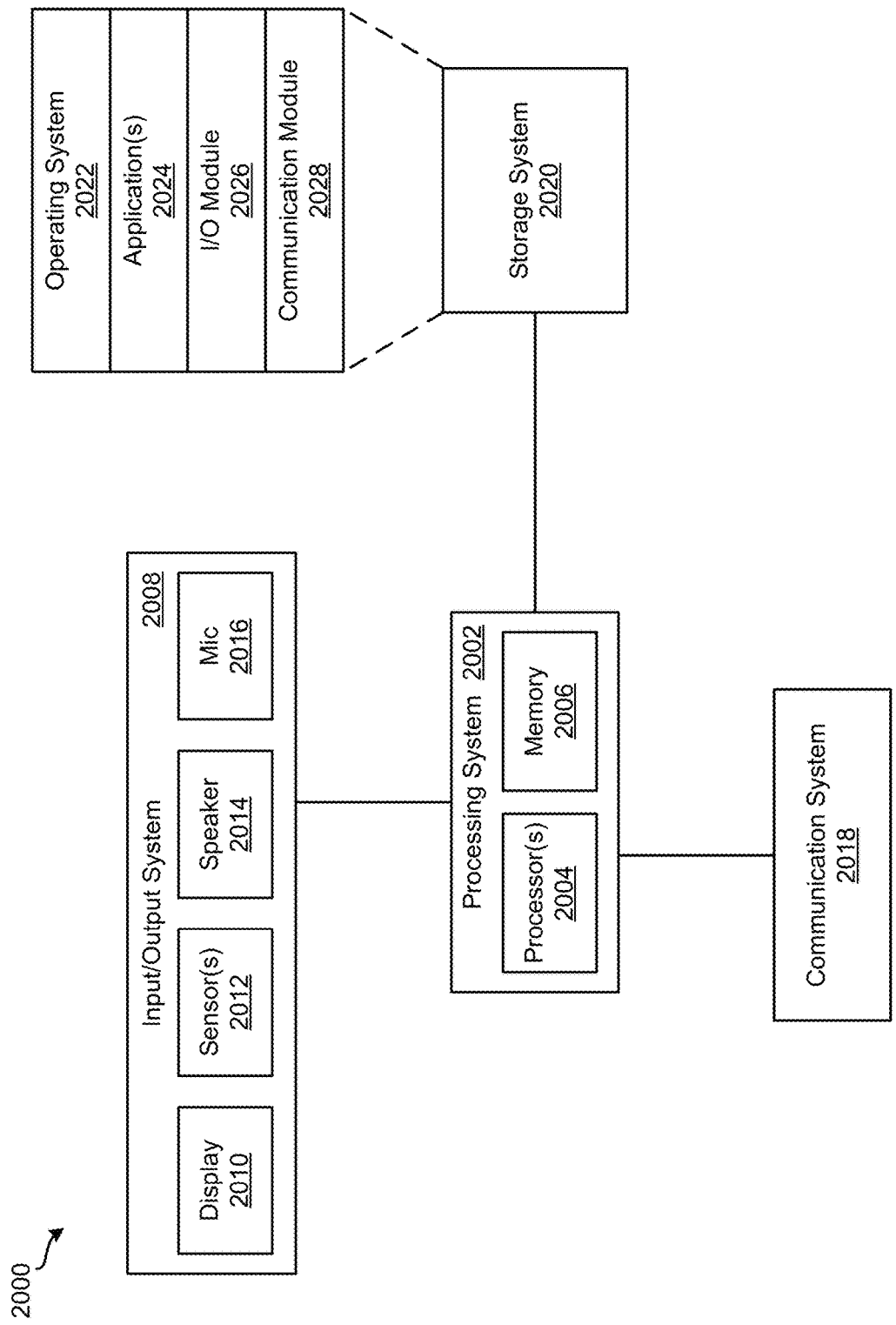
FIG. 20 illustrates an exemplary computing device, in which various embodiments may be implemented.

FIG. 20 illustrates an exemplary computing device 2000 for implementing various embodiments described above. For example, computing device 2000 may be used to implement client device 105. Computing device 2000 may be a cellphone, a smartphone, a wearable device, an activity tracker or manager, a tablet, a personal digital assistant (PDA), a media player, or any other type of mobile computing device or combination thereof. As shown in FIG. 20, computing device 2000 includes processing system 2002, input/output (I/O) system 2008, communication system 2018, and storage system 2020. These components may be coupled by one or more communication buses or signal lines.

Processing system 2002, which can be implemented as one or more integrated circuits (e.g., a conventional microprocessor or microcontroller), controls the operation of computing device 2000. As shown, processing system 2002 includes one or more processors 2004 and memory 2006. Processors 2004 are configured to run or execute various software and/or sets of instructions stored in memory 2006 to perform various functions for computing device 2000 and to process data.

Each processor of processors 2004 may include one processing unit (e.g., a single core processor) or several processing units (e.g., a multicore processor). In some embodiments, processors 2004 of processing system 2002 may be implemented as independent processors while, in other embodiments, processors 2004 of processing system 2002 may be implemented as multiple processors integrate into a single chip. Still, in some embodiments, processors 2004 of processing system 2002 may be implemented as a combination of independent processors and multiple processors integrated into a single chip.

Memory 2006 may be configured to receive and store software (e.g., operating system 2022, applications 2024, I/O module 2026, communication module 2028, etc. from storage system 2020) in the form of program instructions that are loadable and executable by processors 2004 as well as data generated during the execution of program instructions. In some embodiments, memory 2006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 2008 is responsible for receiving input through various components and providing output through various components. As shown for this example, I/O system 2008 includes display 2010, one or more sensors 2012, speaker 2014, and microphone 2016. Display 2010 is configured to output visual information (e.g., a graphical user interface (GUI) generated and/or rendered by processors 2004). In some embodiments, display 2010 is a touch screen that is configured to also receive touch-based input. Display 2010 may be implemented using liquid crystal display (LCD) technology, light-emitting diode (LED) technology, organic LED (OLED) technology, organic electro luminescence (OEL) technology, or any other type of display technologies. Sensors 2012 may include any number of different types of sensors for measuring a physical quantity (e.g., temperature, force, pressure, acceleration, orientation, light, radiation, etc.). Speaker 2014 is configured to output audio information and microphone 2016 is configured to receive audio input. One of ordinary skill in the art will appreciate that I/O system 2008 may include any number of additional, fewer, and/or different components. For instance, I/O system 2008 may include a keypad or keyboard for receiving input, a port for transmitting data, receiving data and/or power, and/or communicating with another device or component, an image capture component for capturing photos and/or videos, etc.

Communication system 2018 serves as an interface for receiving data from, and transmitting data to, other devices, computer systems, and networks. For example, communication system 2018 may allow computing device 2000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 2018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 2018 may provide components configured for wired communication (e.g., Ethernet) in addition to or instead of components configured for wireless communication.

Storage system 2020 handles the storage and management of data for computing device 2000. Storage system 2020 may be implemented by one or more non-transitory machine-readable mediums that are configured to store software (e.g., programs, code modules, data constructs, instructions, etc.) and store data used for, or generated during, the execution of the software.

In this example, storage system 2020 includes operating system 2022, one or more applications 2024, I/O module 2026, and communication module 2028. Operating system 2022 includes various procedures, sets of instructions, software components and/or drivers for controlling and managing general system tasks (e.g., memory management, storage device control, power management, etc.) and facilitates communication between various hardware and software components. Operating system 2022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 2024 can include any number of different applications installed on computing device 2000. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 2026 manages information received via input components (e.g., display 2010, sensors 2012, and microphone 2016) and information to be outputted via output components (e.g., display 2010 and speaker 2014). Communication module 2028 facilitates communication with other devices via communication system 2018 and includes various software components for handling data received from communication system 2018.

One of ordinary skill in the art will realize that the architecture shown in FIG. 20 is only an example architecture of computing device 2000, and that computing device 2000 may have additional or fewer components than shown, or a different configuration of components. The various components shown in FIG. 20 may be implemented in hardware, software, firmware or any combination thereof, including one or more signal processing and/or application specific integrated circuits.

Figure 21:
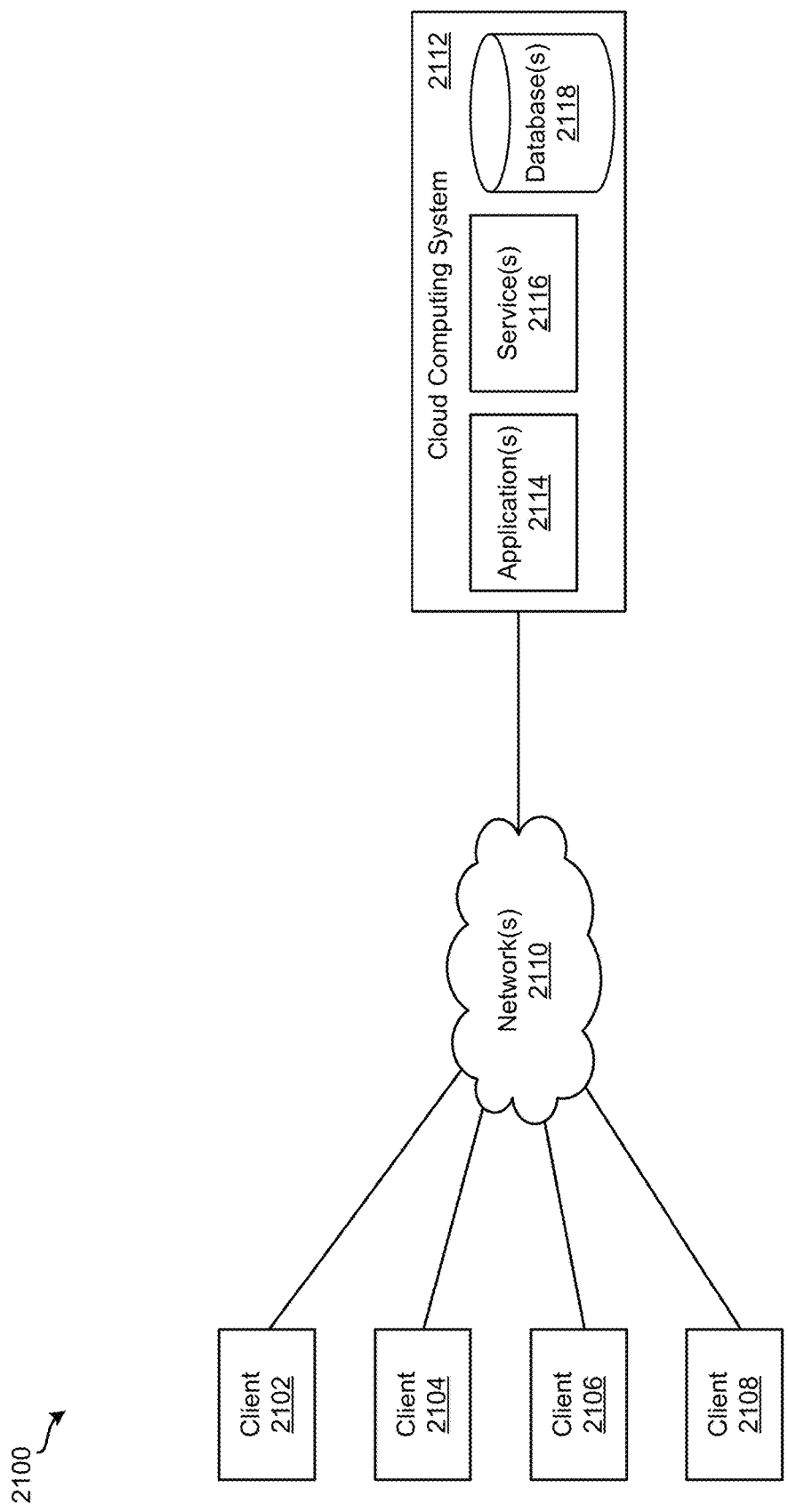
FIG. 21 illustrates system for implementing various embodiments described above.

FIG. 21 illustrates an exemplary system 2100 for implementing various embodiments described above. For example, one of client devices 2102-2108 may be used to implement client device 105 and cloud computing system 2112 of system 2100 may be used to implement computing system 110. As shown, system 2100 includes client devices 2102-2108, one or more networks 2110, and cloud computing system 2112. Cloud computing system 2112 is configured to provide resources and data to client devices 2102-2108 via networks 2110. In some embodiments, cloud computing system 2100 provides resources to any number of different users (e.g., customers, tenants, organizations, etc.). Cloud computing system 2112 may be implemented by one or more computer systems (e.g., servers), virtual machines operating on a computer system, or a combination thereof.

As shown, cloud computing system 2112 includes one or more applications 2114, one or more services 2116, and one or more databases 2118. Cloud computing system 2100 may provide applications 2114, services 2116, and databases 2118 to any number of different customers in a self-service, subscription-based, elastically scalable, reliable, highly available, and secure manner.

In some embodiments, cloud computing system 2100 may be adapted to automatically provision, manage, and track a customer's subscriptions to services offered by cloud computing system 2100. Cloud computing system 2100 may provide cloud services via different deployment models. For example, cloud services may be provided under a public cloud model in which cloud computing system 2100 is owned by an organization selling cloud services and the cloud services are made available to the general public or different industry enterprises. As another example, cloud services may be provided under a private cloud model in which cloud computing system 2100 is operated solely for a single organization and may provide cloud services for one or more entities within the organization. The cloud services may also be provided under a community cloud model in which cloud computing system 2100 and the cloud services provided by cloud computing system 2100 are shared by several organizations in a related community. The cloud services may also be provided under a hybrid cloud model, which is a combination of two or more of the aforementioned different models.

In some instances, any one of applications 2114, services 2116, and databases 2118 made available to client devices 2102-2108 via networks 2110 from cloud computing system 2100 is referred to as a "cloud service." Typically, servers and systems that make up cloud computing system 2100 are different from the on-premises servers and systems of a customer. For example, cloud computing system 2100 may host an application and a user of one of client devices 2102-2108 may order and use the application via networks 2110.

Applications 2114 may include software applications that are configured to execute on cloud computing system 2112 (e.g., a computer system or a virtual machine operating on a computer system) and be accessed, controlled, managed, etc. via client devices 2102-2108. In some embodiments, applications 2114 may include server applications and/or mid-tier applications (e.g., HTTP (hypertext transport protocol) server applications, FTP (file transfer protocol) server applications, CGI (common gateway interface) server applications, JAVA server applications, etc.). Services 2116 are software components, modules, application, etc. that are configured to execute on cloud computing system 2112 and provide functionalities to client devices 2102-2108 via networks 2110. Services 2116 may be web-based services or on-demand cloud services.

Databases 2118 are configured to store and/or manage data that is accessed by applications 2114, services 2116, and/or client devices 2102-2108. For instance, storage 130 and database 135 may be stored in databases 2118. Databases 2118 may reside on a non-transitory storage medium local to (and/or resident in) cloud computing system 2112, in a storage-area network (SAN), on a non-transitory storage medium local located remotely from cloud computing system 2112. In some embodiments, databases 2118 may include relational databases that are managed by a relational database management system (RDBMS). Databases 2118 may be a column-oriented databases, row-oriented databases, or a combination thereof. In some embodiments, some or all of databases 2118 are in-memory databases. That is, in some such embodiments, data for databases 2118 are stored and managed in memory (e.g., random access memory (RAM)).

Client devices 2102-2108 are configured to execute and operate a client application (e.g., a web browser, a proprietary client application, etc.) that communicates with applications 2114, services 2116, and/or databases 2118 via networks 2110. This way, client devices 2102-2108 may access the various functionalities provided by applications 2114, services 2116, and databases 2118 while applications 2114, services 2116, and databases 2118 are operating (e.g., hosted) on cloud computing system 2100. Client devices 2102-2108 may be computer system 1900 or computing device 2000, as described above by reference to FIGS. 19 and 20, respectively. Although system 2100 is shown with four client devices, any number of client devices may be supported.

Networks 2110 may be any type of network configured to facilitate data communications among client devices 2102-2108 and cloud computing system 2112 using any of a variety of network protocols. Networks 2110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving from a client device a request;
   retrieving a calculated dimension definition from a storage configured to store calculated dimension definitions, the calculated dimension definition associated with a calculated dimension referenced in the request;
   generating the calculated dimension based on a subset of stored data in the database, the stored data in the database comprising a set of records organized according to a plurality of fields, the calculated dimension defined by the calculated dimension definition, which specifies a set of fields from the plurality of fields, and a set of operations for deriving calculated values from field values in the set of fields for the calculated dimension;
   generating an intermediary data structure by combining the calculated dimension with the stored data in the database;
   generating results for the request by aggregating intermediary data in the intermediary data structure based on the calculated dimension; and
   providing the results for the request to the client device.

2. The non-transitory machine-readable medium of claim 1, wherein the plurality of fields comprises a plurality of dimensions, wherein the set of fields of the calculated dimension definition comprises a first dimension in the plurality of dimensions and a second dimension in the plurality of dimensions, wherein the set of operations of the calculated dimension definition comprises an operation for concatenating values in the first dimension and the second dimension,
   wherein generating the calculated dimension comprises:
   retrieving from the database the first dimension and the second dimension of the set of records;

iterating through each record in the retrieved set of records; and generating, for each record in the retrieved set of records, a dimension value for the calculated dimension that is associated with the record by concatenating values in the first dimension of the record and the second dimension of the record.

3. The non-transitory machine-readable medium of claim 1, wherein the plurality of fields comprises a plurality of dimensions, wherein the set of fields of the calculated dimension definition comprises a dimension in the plurality of dimensions, wherein the set of operations of the calculated dimension definition comprises an operation for translating values in the dimension from a first plurality of values to a second plurality of values based on a defined mapping, wherein generating the calculated dimension comprises:

retrieving from the database the dimension of the set of records;

iterating through each record in the retrieved set of records; and generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

4. The non-transitory machine-readable medium of claim 1, wherein the plurality of fields comprises a set of measures, wherein the set of fields of the calculated dimension definition comprises a measure in the set of measures, wherein the set of operations of the calculated dimension definition comprises an operation for determining values in the calculated dimension based on values in the measure, wherein generating the calculated dimension comprises:

retrieving from the database the measure of the set of records;

iterating through each record in the retrieved set of records; and generating, for each record in the retrieved set of records, a dimension value for the calculated dimension that is associated with the record by determining a value from a plurality of values based on a value of the measure of the record and using the value as the dimension value.

5. The non-transitory machine-readable medium of claim 1, wherein the program further comprises a set of instructions for, after providing the results, destroying the calculated dimension.

6. The non-transitory machine-readable medium of claim 1, wherein the program further comprises sets of instructions for:

providing a tool for creating calculated dimensions to the client device; and receiving the calculated dimension definition from the user of the client device via the tool.

7. A method, performed by a device, comprising:

receiving from a client device a request;

retrieving a calculated dimension definition from a storage configured to store calculated dimension definitions, the calculated dimension definition associated with a calculated dimension referenced in the request;

generating the calculated dimension based on a subset of stored data in the database, the stored data in the database comprising a set of records organized according to a plurality of fields, the calculated dimension defined by the calculated dimension definition, which specifies a set of fields from the plurality of fields, and a set of operations for deriving calculated values from field values in the set of fields for the calculated dimension;

generating an intermediary data structure by combining the calculated dimension with the stored data in the database;

generating results for the request by aggregating intermediary data in the intermediary data structure based on the calculated dimension; and providing the results for the request to the client device.

8. The method of claim 7, wherein the plurality of fields comprises a plurality of dimensions, wherein the set of fields of the calculated dimension definition comprises a first dimension in the plurality of dimensions and a second dimension in the plurality of dimensions, wherein the set of operations of the calculated dimension definition comprises an operation for concatenating values in the first dimension and the second dimension, wherein generating the calculated dimension comprises:

retrieving from the database the first dimension and the second dimension of the set of records;

iterating through each record in the retrieved set of records; and generating, for each record in the retrieved set of records, a dimension value for the calculated dimension that is associated with the record by concatenating values in the first dimension of the record and the second dimension of the record.

9. The method of claim 7, wherein the plurality of fields comprises a plurality of dimensions, wherein the set of fields of the calculated dimension definition comprises a dimension in the plurality of dimensions, wherein the set of operations of the calculated dimension definition comprises an operation for translating values in the dimension from a first plurality of values to a second plurality of values based on a defined mapping, wherein generating the calculated dimension comprises:

retrieving from the database the dimension of the set of records;

iterating through each record in the retrieved set of records; and generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

10. The method of claim 7, wherein the plurality of fields comprises a set of measures, wherein the set of fields of the calculated dimension definition comprises a measure in the set of measures, wherein the set of operations of the calculated dimension definition comprises an operation for determining values in the calculated dimension based on values in the measure, wherein generating the calculated dimension comprises:

retrieving from the database the measure of the set of records;

iterating through each record in the retrieved set of records; and generating, for each record in the retrieved set of records, a dimension value for the calculated dimension that is associated with the record by determining a value from a plurality of values based on a value of the measure of the record and using the value as the dimension value.

11. The method of claim 7 further comprising, after providing the results, destroying the calculated dimension.

12. The method of claim 7 further comprising:
providing a tool for creating calculated dimensions to the client device; and
receiving the calculated dimension definition from the user of the client device via the tool.

13. A system comprising:
a set of processing units; and
a non-transitory machine-readable medium storing instructions that when executed by at least one processing unit in the set of processing units cause the at least one processing unit to:
receive from a client device a request;
retrieve a calculated dimension definition from a storage configured to store calculated dimension definitions, the calculated dimension definition associated with a calculated dimension referenced in the request;
generate the calculated dimension based on a subset of stored data in the database, the stored data in the database comprising a set of records organized according to a plurality of fields, the calculated dimension defined by the calculated dimension definition, which specifies a set of fields from the plurality of fields, and a set of operations for deriving calculated values from field values in the set of fields for the calculated dimension;
generate an intermediary data structure by combining the calculated dimension with the stored data in the database;
generate results for the request by aggregating intermediary data in the intermediary data structure based on the calculated dimension; and
provide the results for the request to the client device.

14. The system of claim 13, wherein the plurality of fields comprises a plurality of dimensions, wherein the set of fields of the calculated dimension definition comprises a first dimension in the plurality of dimensions and a second dimension in the plurality of dimensions, wherein the set of operations of the calculated dimension definition comprises an operation for concatenating values in the first dimension and the second dimension,
wherein generating the calculated dimension comprises:
retrieving from the database the first dimension and the second dimension of the set of records;
iterating through each record in the retrieved set of records; and
generating, for each record in the retrieved set of records, a dimension value for the calculated dimension that is associated with the record by concatenating values in the first dimension of the record and the second dimension of the record.

15. The system of claim 13, wherein the plurality of fields comprises a plurality of dimensions, wherein the set of fields of the calculated dimension definition comprises a dimension in the plurality of dimensions, wherein the set of operations of the calculated dimension definition comprises an operation for translating values in the dimension from a first plurality of values to a second plurality of values based on a defined mapping,
wherein generating the calculated dimension comprises:
retrieving from the database the dimension of the set of records;
iterating through each record in the retrieved set of records; and
generating, for each record in the retrieved set of records, a dimension value for the calculated dimension that is associated with the record by translating the value in the dimension of the record from a first value in the first plurality of values to a second value in the second plurality of values based on the defined mapping and using the second value as the dimension value.

16. The system of claim 13, wherein the plurality of fields comprises a set of measures, wherein the set of fields of the calculated dimension definition comprises a measure in the set of measures, wherein the set of operations of the calculated dimension definition comprises an operation for determining values in the calculated dimension based on values in the measure,
wherein generating the calculated dimension comprises:
retrieving from the database the measure of the set of records;
iterating through each record in the retrieved set of records; and
generating, for each record in the retrieved set of records, a dimension value for the calculated dimension that is associated with the record by determining a value from a plurality of values based on a value of the measure of the record and using the value as the dimension value.

17. The system of claim 13, wherein the instructions further cause the at least one processing unit to, after providing the results, destroy the calculated dimension.

* * * * *